US011887127B2

(12) United States Patent
Agrawal et al.

(10) Patent No.: US 11,887,127 B2
(45) Date of Patent: Jan. 30, 2024

(54) SYSTEMS AND METHODS FOR MANAGING FOREIGN TRANSACTIONS

(71) Applicant: Capital One Services, LLC, McLean, VA (US)

(72) Inventors: Abhinav Bhagwati Agrawal, Washington, DC (US); Riken Shah, Ashburn, VA (US); Joshua M. Wilbur, Potomac, MD (US); Samuel Fahler, Arlington, VA (US); Colleen Kerr, Washington, DC (US); Jeffrey Samitt, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/703,558

(22) Filed: Mar. 24, 2022

(65) Prior Publication Data

US 2022/0215391 A1    Jul. 7, 2022

Related U.S. Application Data

(63) Continuation of application No. 15/975,467, filed on May 9, 2018, now abandoned.

(51) Int. Cl.
*G06Q 20/40* (2012.01)
*G06F 3/0482* (2013.01)

(52) U.S. Cl.
CPC ......... *G06Q 20/405* (2013.01); *G06F 3/0482* (2013.01); *G06Q 20/409* (2013.01); *G06Q 20/4015* (2020.05)

(58) Field of Classification Search
CPC ............. G06Q 20/405; G06Q 20/4015; G06Q 20/409; G06Q 20/3224; G06F 3/0482
See application file for complete search history.

(56) References Cited

U.S. PATENT DOCUMENTS 9,530,138 B2 * 12/2016 Matthews ............... G06Q 10/02
9,618,343 B2 *  4/2017 Kahn ...................... G06N 5/04
(Continued)

FOREIGN PATENT DOCUMENTS

WO   WO-2010129296 A2 * 11/2010 ............. G06Q 20/12
WO   WO-2016106311 A1 *  6/2016 ......... G06Q 10/0831

OTHER PUBLICATIONS

Visa Merchant Data Standards Manual, Visa Supplemental Requirements (Year: 2016).*
(Continued)

*Primary Examiner* — Scott C Anderson
*Assistant Examiner* — James H Miller
(74) *Attorney, Agent, or Firm* — Perkins Coie LLP

(57) ABSTRACT

Systems and methods are provided for managing foreign transactions. An exemplary method may include providing, to a device of the user, instructions to display an application interface. The application interface may receive user requests to specify a foreign geographical area and to enable and disable the foreign transaction service in the foreign geographical area. The method may also include receiving, through the application interface, a request to enable the foreign transaction service. The method may include associating a transaction rule with the payment account. The transaction rule may define a condition upon which approval of a foreign transaction is permitted. The method may also include receiving a foreign transaction authorization request associated with the payment account. The method may also include approving the foreign transaction authorization request when the condition is met and declining the foreign transaction authorization request when the condition is not met.

20 Claims, 28 Drawing Sheets

(56) References Cited

U.S. PATENT DOCUMENTS

| | | | |
|---|---|---|---|
| 9,824,376 B1* | 11/2017 | Amacker | G06Q 30/06 |
| 10,192,217 B1* | 1/2019 | Ellis | G06Q 20/322 |
| 10,992,679 B1* | 4/2021 | Fakhraie | H04W 12/37 |
| 11,080,724 B1* | 8/2021 | Arnott | H04W 4/021 |
| 2004/0148259 A1* | 7/2004 | Reiners | G06Q 20/10 705/42 |
| 2010/0312700 A1* | 12/2010 | Coulter | G06Q 40/02 705/42 |
| 2013/0046625 A1* | 2/2013 | Grigg | G06Q 30/06 705/21 |
| 2013/0262312 A1* | 10/2013 | Carlson | G06Q 20/425 705/44 |
| 2013/0268839 A1* | 10/2013 | Lefebvre | G06Q 10/107 715/254 |
| 2013/0346302 A1* | 12/2013 | Purves | G06Q 20/102 705/40 |
| 2014/0244411 A1* | 8/2014 | Kim | G06Q 30/0281 705/16 |
| 2014/0279534 A1* | 9/2014 | Miles | G06Q 20/4016 705/44 |
| 2014/0337173 A1* | 11/2014 | Hardie | G06Q 20/306 705/26.41 |
| 2014/0337217 A1* | 11/2014 | Howe | G06Q 20/4016 705/44 |
| 2014/0379540 A1* | 12/2014 | Malone | G06Q 20/405 705/35 |
| 2015/0012436 A1* | 1/2015 | Poole | G06Q 20/34 705/44 |
| 2015/0058225 A1* | 2/2015 | Matthews | G06Q 20/4015 705/44 |
| 2015/0088735 A1* | 3/2015 | Howe | G06Q 20/341 705/41 |
| 2015/0254652 A1* | 9/2015 | Bondesen | G06Q 20/367 705/37 |
| 2015/0254770 A1* | 9/2015 | Bondesen | G06Q 20/381 705/37 |
| 2016/0086222 A1* | 3/2016 | Kurapati | G06Q 40/08 705/14.53 |
| 2016/0140555 A1* | 5/2016 | Scipioni | G06Q 20/20 705/43 |
| 2016/0162810 A1* | 6/2016 | Howe | G06Q 50/14 705/5 |
| 2016/0358122 A1* | 12/2016 | Tiwary | G06Q 20/322 |
| 2016/0371689 A1* | 12/2016 | Brown | G06Q 20/384 |
| 2017/0011398 A1* | 1/2017 | Narasimhan | G06Q 20/108 |
| 2017/0169417 A1* | 6/2017 | Alzamendi | G06Q 50/14 |
| 2017/0193550 A1* | 7/2017 | Misra | G06Q 10/02 |
| 2017/0243313 A1* | 8/2017 | Gupta | G06Q 30/0201 |
| 2017/0364837 A1* | 12/2017 | Tiwari | G06Q 30/0283 |
| 2019/0108546 A1* | 4/2019 | Goodyear | G06Q 30/0239 |
| 2020/0126144 A1* | 4/2020 | Shao | G06Q 20/405 |
| 2023/0252187 A1* | 8/2023 | Fakhraie | G06F 21/6245 705/50 |

OTHER PUBLICATIONS

ISO 8583-1987 Data Element Definitions (Year: 1998).*
NPL: Citibank, "Merchant Category Codes," 2015 (Year: 2015).*
Method to selectively filter uninteresting areas on a time line, IP.com No. IPCOM000200880D (Year: 2010).*
American Express Uses Level 3 Purchase Data on Staples Orders (Year: 2015).*

* cited by examiner

SYSTEMS AND METHODS FOR MANAGING FOREIGN TRANSACTIONS

CROSS-REFERENCE TO RELATED APPLICATION

This application is a continuation of U.S. patent application Ser. No. 15/975,467, filed May 9, 2018. The content of the foregoing application is incorporated herein in its entirety by reference.

FIELD

The present disclosure relates to systems and methods for managing foreign transactions associated with a payment account.

BACKGROUND

Payment cards such as credit cards have been widely used nowadays to facilitate financial transactions ranging from convenient store purchases to online shopping. While most of the credit card transactions occur domestically, e.g., within a card user's home country, an increasing number of card users are now using their credit cards outside of their home country. For example, a traveler traveling in a foreign country may use his/her credit card, which is normally issued by a card issuer in his/her home country, to purchase goods or services in that foreign country. In another example, an online shopper may use his/her credit card to make purchases on a website that uses a payment system located in a foreign country and/or using a foreign currency. The ability to make such foreign transactions allows a user to use the same payment card worldwide, greatly enhancing the utility of the payment card.

While the ability to make foreign transactions provides convenience to card users, it also creates potential security concerns. For example, a fraudster may steal someone's payment card information and make online purchases using the stolen card information on a foreign website. In another example, a fraudster may steal the payment card information and make purchases at a point of sale in a foreign country. It is difficult for current payment systems to prevent or deter such fraudulent activities.

Some systems may allow a user to notify the card issuer when the user is travelling abroad by, for example, calling a customer service number provided by the card issuer. The card issuer may then adjust certain fraud prevention measures associated with the payment card upon receiving the notification. However, since the particular fraud prevention measures adopted by a card issuer may be complicated and may not reflect the user's desired level of control and protection, under such systems the user may still be left with limited or even no protection over foreign transaction related fraudulent activities.

Thus, there is a need for systems and methods capable of providing additional safeguards to manage foreign transactions to reduce foreign transaction related frauds.

SUMMARY

In one aspect, the present disclosure provides a system for managing a foreign transaction service associated with a payment account of a user. The system may include one or more memory devices storing instructions and one or more processors configured to execute the instructions to perform various operations. The operations may include providing, to a device of the user, instructions to display an application interface. The application interface may receive user requests to specify a foreign geographical area and to enable and disable the foreign transaction service in the foreign geographical area. The operations may also include receiving, through the application interface, a request to enable the foreign transaction service in the foreign geographical area. In response to the enable request, the operations may include associating a transaction rule with the payment account. The transaction rule may define a condition upon which approval of a foreign transaction is permitted in the foreign geographical area. The operations may further include receiving a foreign transaction authorization request associated with the payment account. The operations may further include approving the foreign transaction authorization request when the condition is met. The operations may further include declining the foreign transaction authorization request when the condition is not met.

In another aspect, the present disclosure provides a computer-implemented method for managing a foreign transaction service associated with a payment account of a user. The method may include providing, to a device of the user, instructions to display an application interface. The application interface may receive user requests to specify a foreign geographical area and to enable and disable the foreign transaction service in the foreign geographical area. The method may also include receiving, through the application interface, a request to enable the foreign transaction service in the foreign geographical area. In response to the enable request, the method may include associating a transaction rule with the payment account. The transaction rule may define a condition upon which approval of a foreign transaction is permitted in the foreign geographical area. The method may also include receiving a foreign transaction authorization request associated with the payment account. The method may also include approving the foreign transaction authorization request when the condition is met. The method may also include declining the foreign transaction authorization request when the condition is not met.

In yet another aspect, the present disclosure provides a non-transitory computer-readable medium storing instructions executable by a processor to cause the processor to perform operations for managing a foreign transaction service associated with a payment account of a user. The operations may include providing, to a device of the user, instructions to display an application interface. The application interface may receive user requests to specify a foreign geographical area and to enable and disable the foreign transaction service in the foreign geographical area. The operations may also include receiving, through the application interface, a request to enable the foreign transaction service in the foreign geographical area. In response to the enable request, the operations may include associating a transaction rule with the payment account. The transaction rule may define a condition upon which approval of a foreign transaction is permitted in the foreign geographical area. The operations may further include receiving a foreign transaction authorization request associated with the payment account. The operations may further include approving the foreign transaction authorization request when the condition is met. The operations may further include declining the foreign transaction authorization request when the condition is not met.

In a further aspect, the present disclosure provides a system for temporarily enabling a foreign transaction feature associated with a payment account of a user. The system may include one or more memory devices storing instructions and one or more processors configured to execute the instructions to perform various operations. The operations may include receiving a transaction authorization request associated with the payment account. The operations may also include determining whether the transaction authorization request is initiated at a travel portal based on merchant information associated with the transaction authorization request. Responsive to a determination that the transaction authorization request is initiated at the travel portal, the operations may include providing instructions, to a device associated with the user, for displaying an application interface receiving user requests to enable the foreign transaction feature. The operations may also include receiving, from the user device, a request to enable the foreign transaction feature. Responsive to the enable request, the operations may include temporarily enabling the foreign transaction feature by associating a transaction rule with the payment account. The transaction rule may define a condition upon which approval of a foreign transaction is permitted.

In another aspect, the present disclosure provides a computer-implemented method for temporarily enabling a foreign transaction feature associated with a payment account of a user. The method may include receiving a transaction authorization request associated with the payment account. The method may also include determining, based on merchant information associated with the transaction authorization request, whether the transaction authorization request is initiated at a travel portal. Responsive to a determination that the transaction authorization request is initiated at a travel portal, the method may include providing, to a device associated with the user instructions for displaying an application interface receiving user requests to enable the foreign transaction feature. The method may also include receiving, from the user device, a request to enable the foreign transaction feature. Responsive to the enable request, the method may include temporarily enabling the foreign transaction feature by associating a transaction rule with the payment account. The transaction rule may define a condition upon which approval of a foreign transaction is permitted.

In another aspect, the present disclosure provides a non-transitory computer-readable medium storing instructions executable by a processor to cause the processor to perform operations for temporarily enabling a foreign transaction feature associated with a payment account of a user. The operations may include receiving a transaction authorization request associated with the payment account. The operations may also include determining whether the transaction authorization request is initiated at a travel portal based on merchant information associated with the transaction authorization request. Responsive to a determination that the transaction authorization request is initiated at the travel portal, the operations may include providing instructions, to a device associated with the user, for displaying an application interface receiving user requests to enable the foreign transaction feature. The operations may also include receiving, from the user device, a request to enable the foreign transaction feature. Responsive to the enable request, the operations may include temporarily enabling the foreign transaction feature by associating a transaction rule with the payment account. The transaction rule may define a condition upon which approval of a foreign transaction is permitted.

The foregoing general description and the following detailed description are exemplary and are not restrictive to the claims.

DETAILED DESCRIPTION OF THE INVENTION

The present disclosure describes systems and methods for managing a foreign transaction service (also referred to as a foreign transaction feature) associated with a payment account of a user. Embodiments of the present disclosure allow the user to enable and disable the foreign transaction service through an application interface provided on a user device. When enabled, the foreign transaction service may be automatically turned off or disabled after a predetermined or user-defined time period. Some embodiments may also trigger an alert to allow the user to enable the foreign transaction service based on a determination that the user makes a certain transaction at a travel portal such as an international airport.

Figure 1:
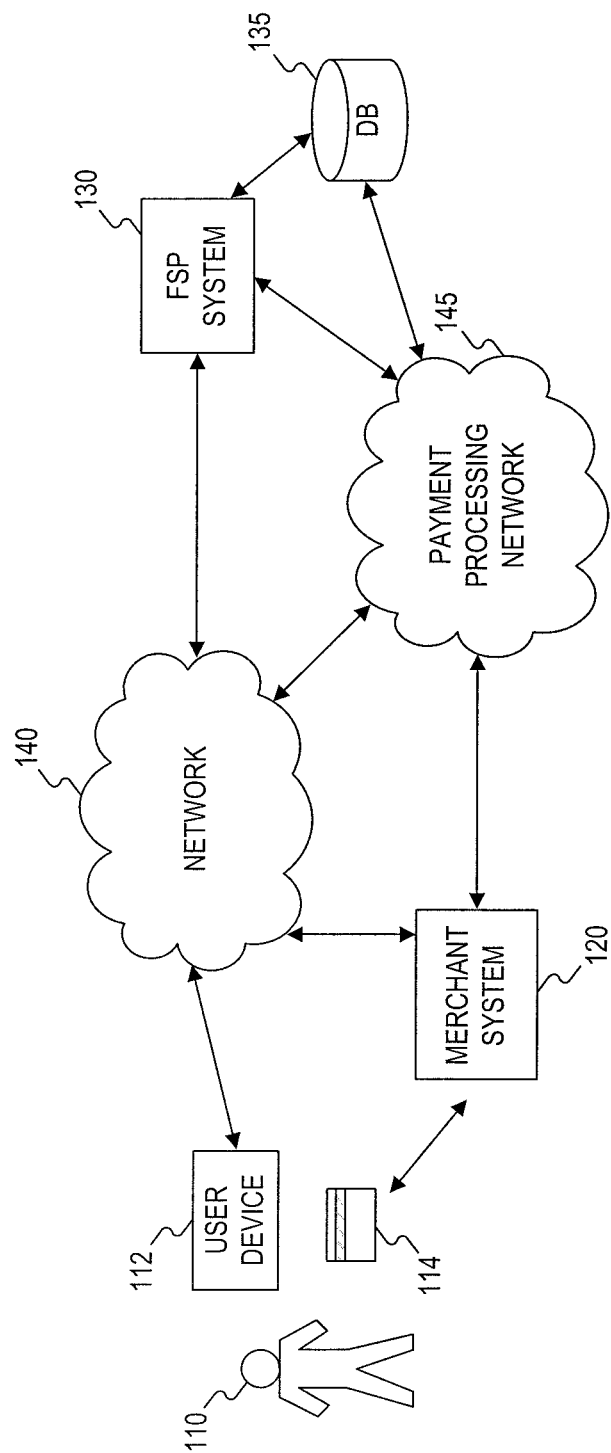
FIG. 1 is a block diagram of an exemplary financial transaction system, consistent with the disclosed embodiments.

FIG. 1 shows a diagram of an exemplary financial transaction system 100 configured to manage a foreign transaction service, consistent with disclosed embodiments. As shown in FIG. 1, system 100 may include a user device 112 and a payment card 114 associated with a payment account of a user 110. For example, the payment account may include a credit card account, a charge card account, a debit card account, etc. Payment card 114 may include a credit card, a charge card, a debit card, etc. System 100 may also include a merchant system 120 with which user 110 may enter into a financial transaction using payment card 114 or user device 112. Merchant system 120 may include a point-of-sale (POS) system, an online payment system, a mobile payment system, etc. Merchant system 120 may communicate with a financial service provider (FSP) system 130 via a transaction processing network 145 to authorize the financial transaction. System 100 may also include a database 135 accessible to FSP system 130 and/or transaction processing network 145 to authorize or otherwise process the transaction, among other things. System 100 may also include a network 140 to facilitate communication among the components of system 100. Network 140 may also facilitate a user device 112 to communicate with FSP system 130 to request and register with the financial service provider one or more transaction rules to be associated with the user's payment account.

The components and arrangement of the components included in system 100 may vary. Thus, system 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

A user 110 may operate a user device 112, which may be a desktop computer, laptop, tablet, smartphone, multifunctional watch, pair of multifunctional glasses, tracking device, or any suitable device with computing and communication capability. User device 112 may have a financial application installed thereon, which may enable user device 112 to communicate with FSP system 130 via network 140 and perform aspects of the disclosed embodiments. For example, user device 112 may connect to FSP system 130 through use of browser software, mobile application software, or the like. User device 112 may allow a user to access information stored in FSP system 130, such as, for example, financial information related to recent purchase transactions, financial statements, account information, rewards program information and the like. User device 112 may also be configured to manage the foreign transaction service associated with user 110's payment account with the financial service provider. An exemplary computer system consistent with user device 112 is discussed in greater detail with respect to FIG. 2.

User 110 may operate user device 112 to perform one or more operations for managing a customer or client account associated with FSP system 130, such as managing a foreign transaction service. In some aspects, user 110 may be a customer or client of a financial service provider associated with FSP system 130. For instance, a financial service provider may maintain a financial service account (e.g., credit card account, charge card account, checking account, etc.) that user 110 may use in a foreign transaction, such as, for example, a foreign transaction initiated, at a foreign POS, an online shopping portal, a mobile application, or other types of merchant system. Consistent with disclosed embodiments, user 110 may operate user device 112 to manage (e.g., enable or disable) the foreign transaction service or feature associated with the user's payment account. A foreign transaction may be initiated with a merchant system 120 using any known method, such as presentation of a payment card 114 (e.g., a charge card, credit card, debit card, etc.), or presentation of payment card information (e.g., providing payment card information to an online shopping portal, a mobile payment system, etc.). Further, user 110 may operate user device 112 to view a financial service account status report or financial statement provided by a financial service provider or FSP system 130, and perform certain requests to enable or disable the foreign transaction service.

Payment card 114 may include a physical card, a dongle, a fob, an e-wallet, an electronic device, or other payment device, typically issued by a financial service provider and associated with a customer or client account. Payment card 114 enables user 110 to enter into a foreign transaction.

In accordance with disclosed embodiments, FSP system 130 may be a system associated with a financial service provider (not shown), such as a bank, a credit card company, a lender, brokerage firm, or any other type of financial service entity that generates, provides, manages, and maintains financial service accounts for users 110. FSP system 130 may include one or more computing systems that are configured to execute software instructions stored on one or more memory devices to perform operations consistent with the disclosed embodiments. For example, FSP system 130 may include one or more memory device(s) storing data and software instructions and one or more processor(s) configured to use the data and execute the software instructions to perform server-based functions and operations known to those skilled in the art. FSP system 130 may include one or more computing components specifically programmed and combined or arranged to perform the disclosed methods.

In certain embodiments, FSP system 130 may be configured as a particular apparatus, system, and the like, based on the storage, execution, and/or implementation of the software instructions that perform operations consistent with the disclosed embodiments. FSP system 130 may be a standalone system, or it may be part of a subsystem, which may be part of a larger system. For example, FSP system 130 may represent distributed servers that are remotely located and communicate over a public network (e.g., network 140) or a dedicated network, such as a LAN, for a financial service provider. An exemplary computing system consistent with FSP system 130 is discussed in additional detail with respect to FIG. 2, below.

FSP system 130 may include or may access one or more storage devices configured to store data and/or software instructions used by one or more processors of FSP system 130 to perform operations consistent with the disclosed embodiments. For example, FSP system 130 may include memory configured to store one or more software programs that perform functions when executed by a processor, including functions specific to the disclosed methods.

The disclosed embodiments are not limited to separate programs or computers configured to perform dedicated tasks. For example, FSP system 130 may include memory that stores a single program or multiple programs. Additionally, FSP system 130 may execute one or more programs located remotely from FSP system 130. For example, FSP system 130 may access one or more remote programs stored in memory included with a remote component (such as database 135) that, when executed, perform operations consistent with the disclosed embodiments.

In certain aspects, FSP system 130 and/or database 135 may include server software that generates, maintains, and provides services associated with processing financial transactions. In some embodiments, FSP system 130 may connect with separate server(s) or other computing devices associated with database 135 that generate, maintain, and provide services associated with financial data for a financial service provider associated with FSP system 130. For example, database 135 may include a plurality of storage and processing components and associated software for storing account information of customers or clients of a financial service provider for use in authorizing and processing a transaction. Database 135 may be associated with FSP system 130 and made accessible to transaction processing network 145 for performing various transaction authorization and processing functionality. In some embodiments, database 135 may be provided as part of transaction processing network 145.

System 100 may also include one or more merchant systems 120. Merchant system 120 may be a computing system that is associated with a merchant or other business entity that provides goods and/or services, such as a restaurant, retailer, grocery store, service provider (e.g., utilities, etc.), or any other type of entity that may engage in any financial transaction (e.g., charity, tax collector, etc.) or other commercial transaction with a consumer, including health care providers, education providers, etc. While system 100 is shown with one merchant system 120 for ease of discussion, the disclosed embodiments may also be implemented in a system 100 including two or more merchant systems 120 associated with any number of underlying entities (commercial or otherwise). Further, merchant system 120 is not limited to conducting business in any particular industry or field.

Merchant system 120 may be associated with a physical "brick-and-mortar" location that a user 110 may physically visit to purchase goods and/or services. Such physical locations may include computing devices that perform financial service transactions with consumers (e.g., Point of Sale (POS) terminal(s), kiosks, etc.). Merchant system 120 may also be associated with a merchant that provides goods and/or services via known online or e-commerce types of systems. For example, such a merchant may sell goods or otherwise accept payment via a website or mobile application using known online or e-commerce systems to market, sell, and process online transactions conducted via network 140, for example.

In one embodiment, merchant system 120 may include one or more servers or other type of computer devices. The merchant system server(s) may be one or more computing devices configured to execute software instructions stored in memory to perform processes consistent with the disclosed embodiments. For example, merchant system 120 may include one or more memory device(s) storing data and software instructions, and one or more processor(s) configured to use the data and execute the software instructions to perform server-based functions and operations known to those skilled in the art.

Merchant system 120 may further include server(s) that are configured to execute stored software instructions to perform operations associated with a merchant, including one or more processes associated with pre-authorization and processing of foreign transactions, generating transaction data (e.g., merchant name and location identifiers), and generating product data (e.g., SKU data) relating to foreign transactions, etc. Merchant 120 may include one or more servers implemented as, for example, a general purpose computer, a mainframe computer, or any combination of these components. In certain embodiments, merchant system 120 (or a system including merchant system 120) may be configured as a particular apparatus, system, and the like based on the storage, execution, and/or implementation of the software instructions that perform operations consistent with the disclosed embodiments. A merchant server may be standalone, or it may be part of a subsystem, which may be part of a larger system. For example, a merchant server may represent distributed servers that are remotely located and communicate over a public network (e.g., network 140) or a dedicated network, such as a LAN. An exemplary computing system consistent with merchant system 120 is discussed in additional detail with respect to FIG. 2.

In certain aspects, merchant system 120 may include one or more web servers that execute software to generate, maintain, and provide a web site(s) for a respective merchant that is accessible over network 140. In other aspects, a merchant system 120 may connect separately to web server(s) or similar computing devices that generate, maintain, and provide a web site(s) for a merchant.

In certain embodiments, a merchant may operate computing components associated with merchant system 120 to perform processes consistent with the disclosed embodiments. For example, merchant system 120 may be configured to execute software instructions to provide transaction data and/or other data relating to foreign transactions to FSP system 130 over network 140 or transaction processing network 145. Additionally, merchant system 120 may be configured to execute software instructions to perform pre-authorization and other transaction processing operations regarding a foreign transaction entered into using a financial service account associated with FSP system 130. These processes may be performed using transaction processing network 145 that may be in communication with FSP system 130 and database 135.

Transaction processing network 145 may include a plurality of computing components, systems, and subsystems in communication with merchant system 120, FSP system 130, and database 135 for processing a financial transaction, such as a foreign transaction. For conciseness, transaction processing network 145 may include any configuration or combination of known transaction processing networks and systems implemented for authorizing, clearing, and settling a foreign transaction. Transaction processing network 145 may generally include the underlying systems for receiving a transaction authorization request from a merchant system 120, performing verification and fraud analysis on the transaction request, communicating with a FSP system 130 associated with the transaction request, providing an authorization decision to merchant system 120, clearing an authorized transaction, and settling the transaction through the payment of funds or otherwise. In some embodiments, transaction processing network 145 may include a number of additional systems (not shown), such as a financial service provider system associated with merchant system 120, a third party transaction processor system, a card network and processing system (e.g., such as Visa, MasterCard, etc.) and other systems related to processing financial transactions. In some embodiments, aspects of transaction processing network 145 may include aspects of network 140 for the communication of various transaction data or other communications between various systems of payment processing network 145.

Network 140 may comprise any type of computer networking arrangement used to exchange data. For example, network 140 may be the Internet, a private data network, a virtual private network using a public network, a Wi-Fi network, a LAN or WAN network, and/or other suitable connections that may enable information exchange among various components of system 100. Network 140 may also include a public switched telephone network ("PSTN") and/or a wireless cellular network. Network 140 may be a secured network or unsecured network. In some embodiments, one or more components of system 100 may communicate directly through a dedicated communication link(s), such as links between FSP system 130 and merchant system 120.

Other components known to one of ordinary skill in the art may be included in system 100 to process, transmit, provide, and receive information consistent with the disclosed embodiments. In addition, although not shown in FIG. 1, components of system 100 may communicate with each other through direct communications, rather than through network 140. Direct communications may use any suitable technologies, including close range communication protocols, such as those employed under the name BLUETOOTH™ or BLUETOOTH LE™, and Wi-Fi, or any known near field communications (NFC) techniques, or other suitable communication methods that provide a medium for transmitting data between separate devices.

Figure 2:
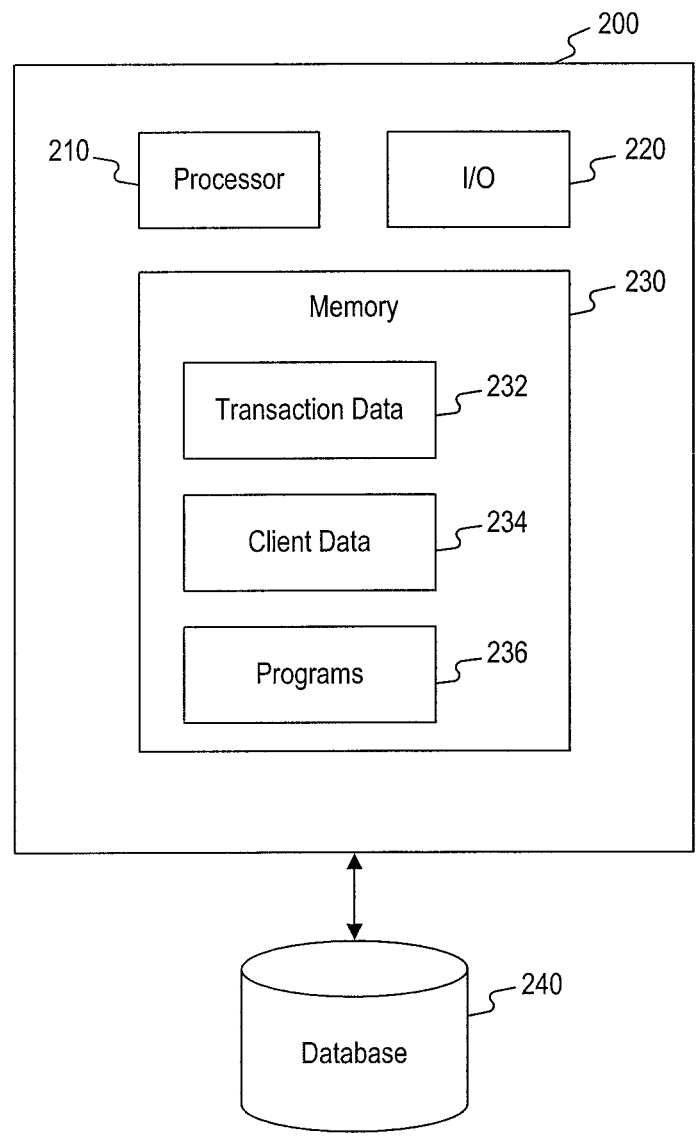
FIG. 2 is a block diagram of an exemplary computing system, consistent with the disclosed embodiments.

System 100 includes a number of components generally described as computing devices. Each of the computing devices may include any number of computing components particularly configured as general or special purpose computing device to perform the functionality disclosed herein. FIG. 2 shows a diagram of an exemplary computing system 200 illustrating a computing system configuration that may be associated with FSP system 130, merchant system 120, one or more payment processing systems provided as part of transaction processing network 145, and/or user device 112, consistent with the disclosed embodiments.

In one embodiment, computing system 200 may include one or more processors 210, one or more memories 230, and one or more input/output (I/O) devices 220. In some embodiments, computing system 200 may take the form of a server, specially-programmed computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be standalone, or it may be part of a subsystem, which may be part of a larger system.

Processor 210 may include one or more known processing devices, such as a microprocessor from the Pentium™ or Xeon™ family manufactured by Intel™, the Turion™ family manufactured by AMD™, or any of various processors manufactured by Sun Microsystems, for example. Processor 210 may constitute a single-core or multiple-core processor that executes parallel processes simultaneously. For example, processor 210 may be a single-core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions executable by processor 210 to perform operations associated with the disclosed embodiments. The disclosed embodiments are not limited to separate programs or computers configured to perform dedicated tasks. For example, memory 230 may include a program 236 that performs the functions of computing system 200, or program 236 could comprise multiple programs. Additionally, processor 210 may execute one or more programs located remotely from computing system 200. For example, FSP system 130, merchant system 120, or user device 112, may, via computing system 200 (or variants thereof), access one or more remote programs that, when executed, perform functions related to certain disclosed embodiments. Processor 210 may further execute one or more programs located in database 240. In some embodiments, programs 236 may be stored in an external storage device, such as a cloud server located outside of computing system 200, and processor 210 may execute programs 236 remotely.

Programs executed by processor 210 may cause processor 210 to execute operations related to financial services provided to users including, but not limited to, processing credit and debit card transactions including foreign transactions, checking transactions, fund deposits and withdrawals, transferring money between financial accounts, lending loans, processing payments for credit card and loan accounts, and generating and associating transaction rules to one or more accounts according to the disclosed embodiments.

Memory 230 may also store data that may reflect any type of information in any format that the system may use to perform operations consistent with the disclosed embodiments. Memory 230 may store instructions to enable processor 210 to execute applications, such as server applications, network communication processes, and any other type of application or software, including software directed to enabling a user or customer to enable and disable a foreign transaction service according to the disclosed embodiments. Alternatively, the instructions, application programs, etc., may be stored in an external storage (such as database 240) in communication with computing system 200 via network 140 or any other suitable network. Memory 230 may be a volatile or non-volatile, magnetic, semiconductor (e.g., EEPROM, flash memory, etc.), tape, optical, removable, non-removable, or other type of storage device or tangible (i.e., non-transitory) computer-readable medium.

Memory 230 may include transaction data 232. Transaction data 232 may include information related to purchase or payment transactions initiated by user 110. For example, transaction data may include a user identifier ("ID"), a country code or location code indicating the geographic region of the merchant, a transaction amount, and any other relevant transaction or merchant-specific information. The user identifier may be a credit or charge card number, an account number, or another means for identifying the user initiating the transaction. The transaction amount may include a value representing the total amount of cash requested by user 110. In other embodiments, transaction data 232 may include other general information related to the transaction including the time and date of the transaction, reason for the transaction, etc.

In some embodiments, merchant system 120 may collect, generate, and provide transaction data relating to purchase transactions involving a user to FSP system 130 and/or other systems provided as part of transaction processing network 145. Merchant system 120 may provide the transaction data to FSP system 130 via transaction processing network 145 or network 140. Alternatively, transaction data 232 may be stored in database 240, which may be an external storage device in communication with computing system 200 via network 140 or any other suitable network including transaction processing network 145.

Memory 230 may further include client data 234, which may include information about individual clients of the financial service provider. For example, client data 234 may include client account information, credit or debit card information, history of purchase and/or payment transactions, financial statements, and one or more transaction rules consistent with disclosed embodiments. Client data 234 may include a data record associating a client account with one or more other accounts according to the transaction rules. Client data 234 may further contain one or more user profiles corresponding to individual client accounts. In some embodiments, client data 234 may be stored in database 240, which may be an external storage device in communication with computing system 200 via network 140 or any other suitable network including transaction processing network 145.

Processor 210, upon execution of programs 236, may perform the functionality of the disclosed embodiments for managing a foreign transaction service or feature. In the disclosed embodiments, processor 210 may analyze received transaction data 232 in reference to one or more transaction rules associated with client data 234 to perform the disclosed functionality.

For example, processor 210 may analyze transaction data to determine which client having information stored in client information 234 is initiating the transaction. Additionally, processor 210 may analyze the transaction data 232 with respect to one or more transaction rules in association with client data 234 to determine whether the transaction may be authorized. In some embodiments, processor 210 may analyze a client request to enable foreign transaction service, and associate a transaction rule with the client account stored in client data 234 to update the client account information accordingly. Processor 210 may also access data records stored as client data 234 to determine client account information, debit or credit card information, history of purchase transactions, financial statements and/or one or more transaction rules associated with an account. Other programmable functions of processor 210 are described in greater detail below.

I/O devices 220 may include one or more devices configured to allow data to be received and/or transmitted by computing system 200. I/O devices 220 may include one or more digital and/or analog communication devices that allow computing system 200 to communicate with other machines and devices, such as other components of system 100 shown in FIG. 1. Computing system 200 may also include interface components for one or more input devices, such as keyboards, mouse devices, touch screens, and the like, which may enable computing system 200 to receive input from an operator of FSP system 130 (not shown) or from user 110.

Computing system 200 may also contain one or more database(s) 240, or may be communicatively connected to database(s) 240 through a direct connection and/or a network (e.g., network 140, transaction processing network 145, etc.). Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. Database 240 may include computing components (e.g., database management system, database server, etc.) configured to receive and process requests for data stored in memory devices of database(s) 240 and to provide data from database 240.

As discussed above, FSP system 130 may include at least one computing system 200. Further, although sometimes discussed here in relation to FSP system 130, it should be understood that variations of computing system 200 may be implemented in other components of system 100, including merchant system 120, aspects of transaction processing network 145, and user device 112. Computing system 200 may be a single server or may be configured as a distributed computer system including multiple servers or computers that interoperate to perform processes and functionalities associated with the disclosed embodiments.

In some embodiments, merchant system 120 may include the same or similar configuration and/or components of computing system 200. Computing system 200 when implemented in merchant system 120 may include any hardware and/or software installed therein necessary for performing methods and processes of the disclosed embodiments, such as for example, the processing of a foreign transaction.

The following processes are directed to various embodiments for managing a foreign transaction service, such as enabling a user 110 to control whether or not to enable the foreign transaction service. In particular, the processes of some embodiments implement a time-based and/or geographic area-based restriction on the use of a foreign transaction service. In some embodiments, the foreign transaction service is disabled by default, and a user 110 may enable the foreign transaction service for a limited time period. In some embodiments, user 110 may choose to enable the foreign transaction service for one or more particular foreign countries, regions (e.g., a region including a group of countries), geographic areas, or the like. User 110 may also disable the foreign transaction service. The following processes may be performed by various aspects and components of system 100 and computing system 200, as is apparent from the disclosure.

Figure 3A:
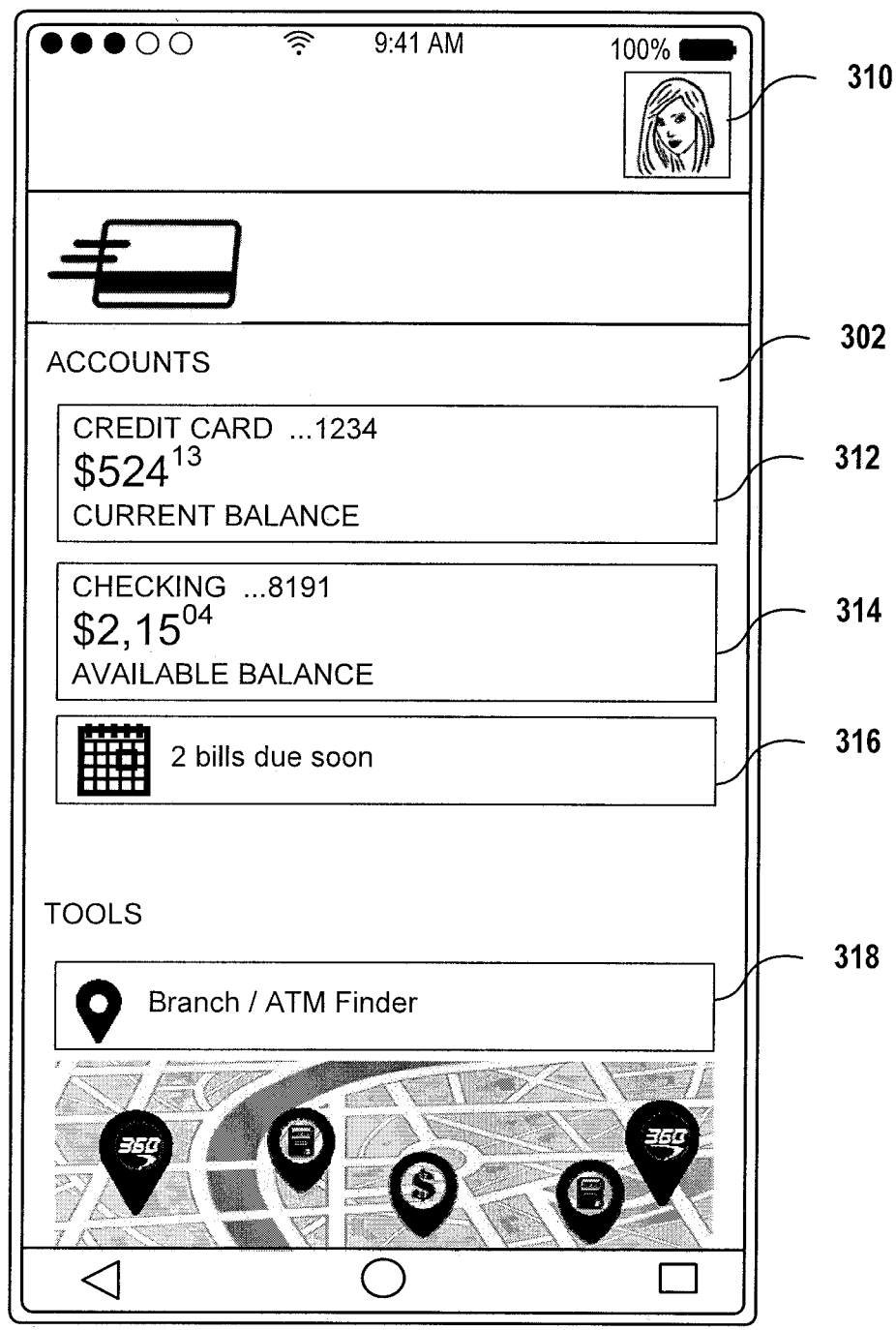
FIGS. 3A-3H are examples of user device interfaces configured to receive user inputs to manage a foreign transaction service, consistent with the disclosed embodiments.

FIGS. 3A-3H show a series of exemplary application interfaces that are configured to allow a user 110 to manage a foreign transaction service associated with a payment account of the user. The interfaces may be part of a mobile application installed on user device 112, or may be implemented as part of a website or web portal that can be accessed by user 110 using a browser software application. FIG. 3A shows an exemplary interface 300 displaying several groups of general information associated with financial accounts of user 110. For example, interface 300 may include a user profile icon 310, such as a photo or avatar indicating the identify of user 110. Interface 300 may also include an account information portion 302, including, for example, a list of financial accounts of user 110, such as a credit card account 312, a checking account 314, and bills information 316. Interface 300 may also include a tools portion 318 including, for example, a map showing nearby branches or ATMs. In some embodiments, interface 300 may be the main interface or entry interface from which user 110 may view additional information or make any desirable changes to the account settings.

Figure 3B:
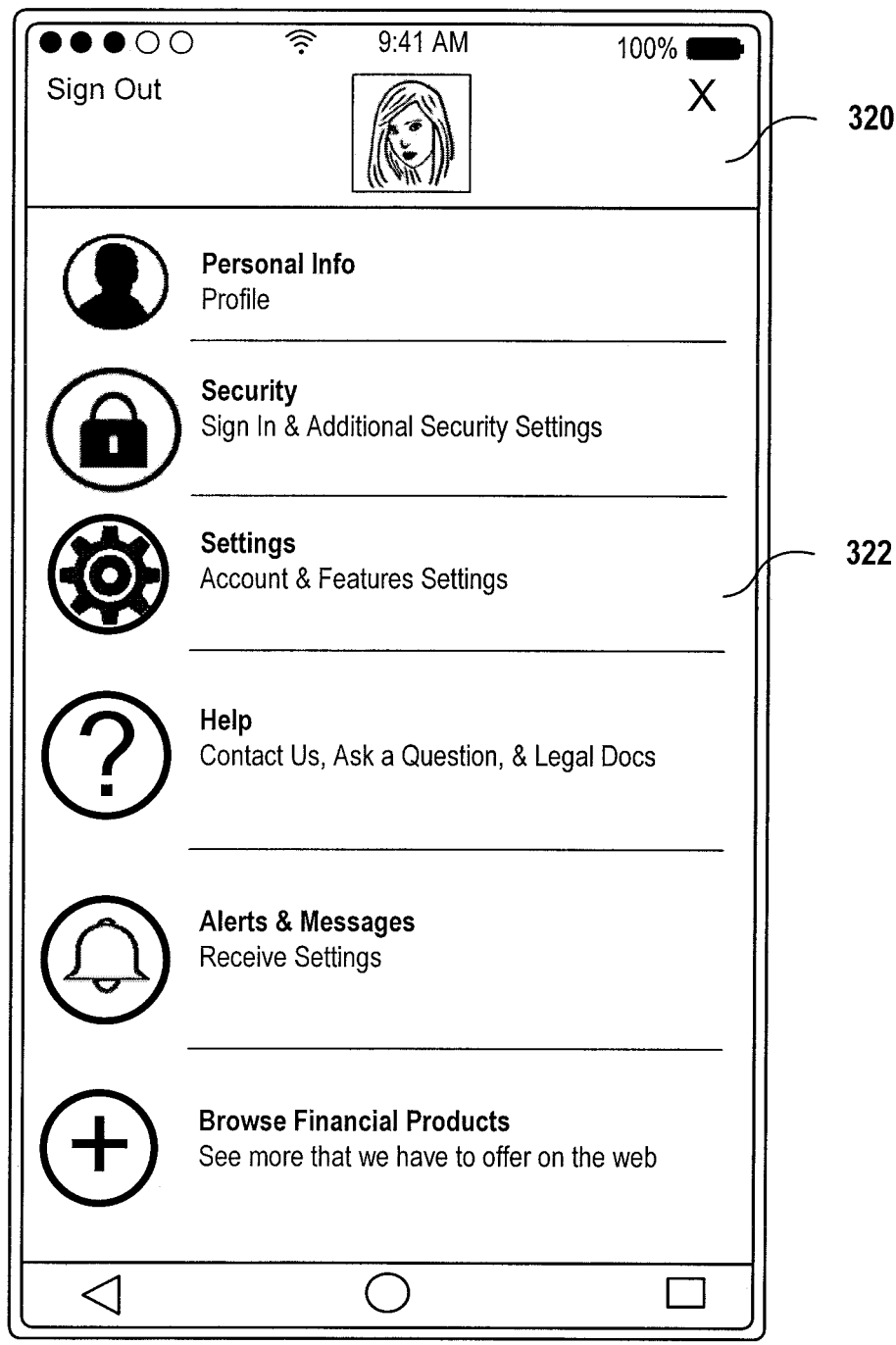

User 110 may select user profile icon 310 by clicking or touching the icon to access a user profile interface. An exemplary user profile interface 320 is shown in FIG. 3B. User profile interface 320 may include information such as personal profile, security settings, account & features settings, help information, alerts & messages, available financial products, etc., as shown in FIG. 3B. Among them, Settings 322 may include various settings for account features, such as a foreign transaction feature.

Figure 3C:
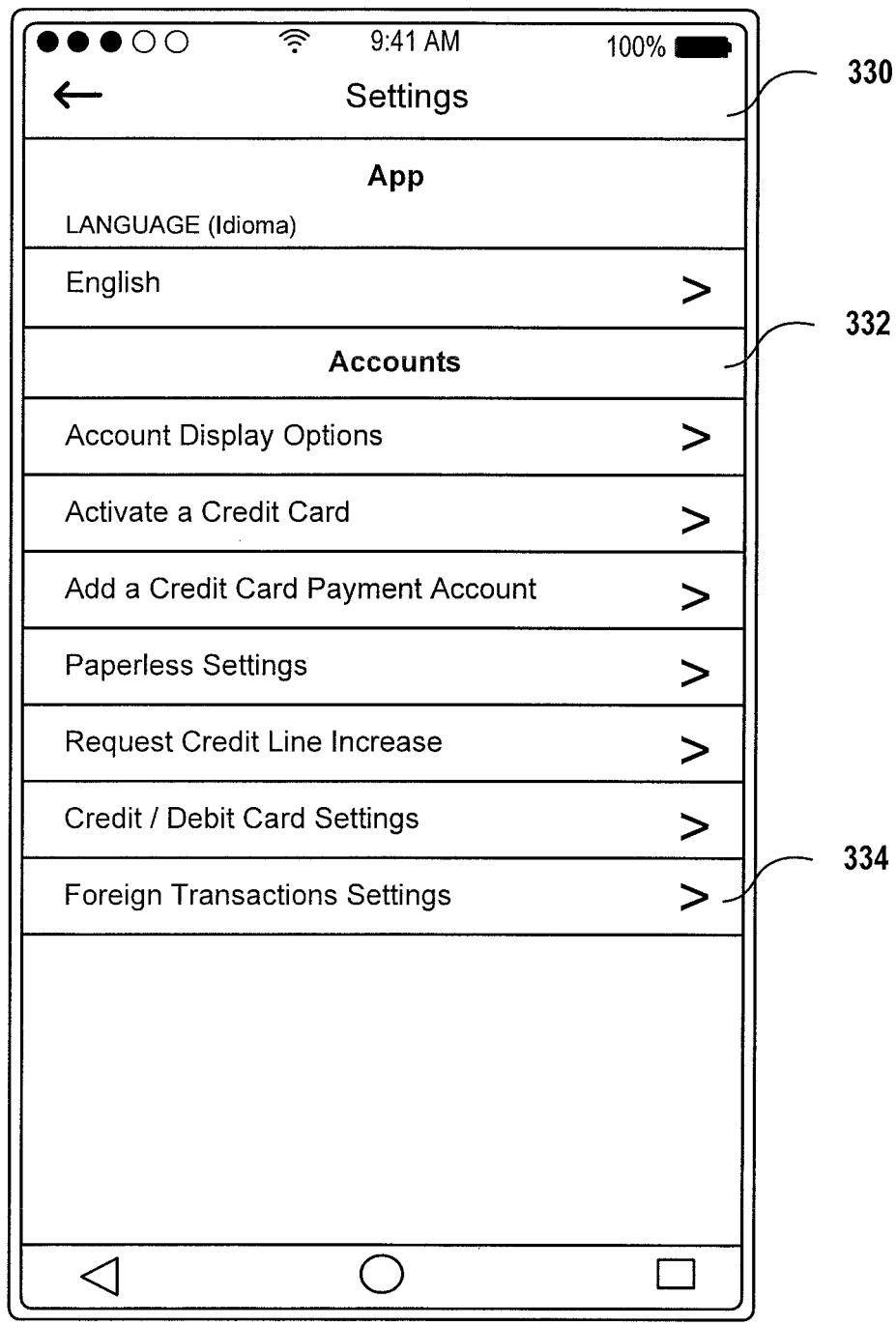

User 110 may select Settings 322 by clicking or touching the Settings option to access a setting interface. An exemplary setting interface 330 is shown in FIG. 3C. Setting interface 330 may include information such as interface language and various account settings or features 332, such as account display options, credit card activation, adding a payment account, paperless settings, requesting credit line increase, credit/debit card settings, and foreign transaction settings 334. Foreign transaction settings 334 may allow user 110 to manage the foreign transaction feature associated with a payment account of user 110.

Figure 3D:
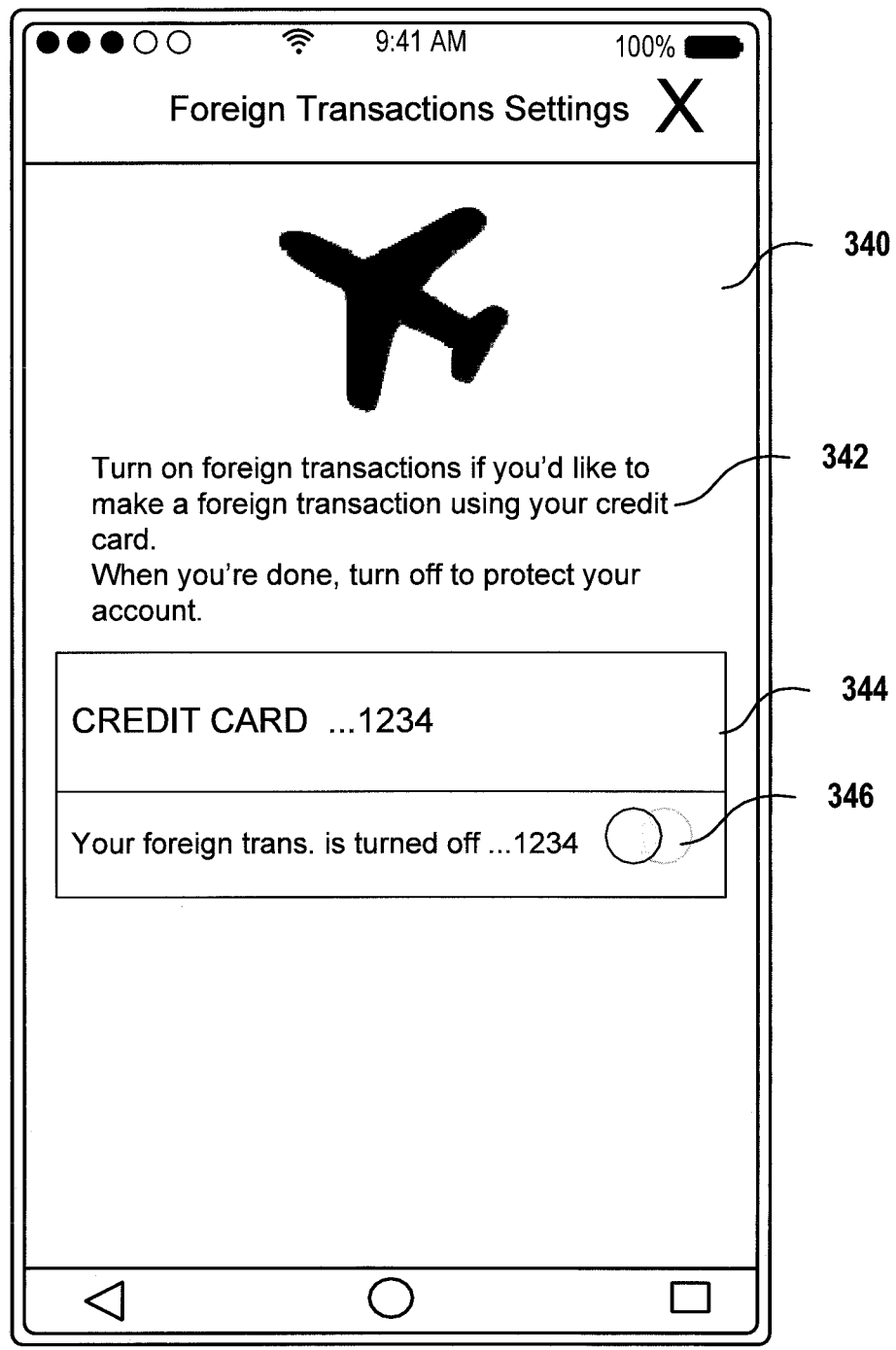

FIG. 3D shows an exemplary interface 340 allowing user 110 to manage the foreign transaction feature associated with a payment account of the user. Interface 340 can be accessed by selecting foreign transaction settings menu item 334 in FIG. 3C. As shown in FIG. 3D, interface 340 may be configured to display an instruction 342 and a foreign transaction management tool 344. In some embodiment, foreign transaction management tool 344 may correspond to a payment account of user 110. For example, FIG. 3D shows that foreign transaction management tool 344 corresponds to an identification number of a credit card account of user 110 ending with "1234." In some embodiments, foreign transaction management tool 344 may include a user-selectable switch, such as switch 346, to receive user inputs to enable (also referred to as "turn on") and disable (also referred to as "turn off") the foreign transaction feature. Foreign transaction management tool 344 may also include an indication indicating the current status of the foreign transaction feature. For example, FIG. 3D shows that the foreign transaction feature is currently turned off or disabled. The indication can be provided through words (e.g., "Your foreign trans. is turned off") or image(s) (e.g., switch 346 is at its "OFF" position), or a combination of words and image(s).

Figure 3E:
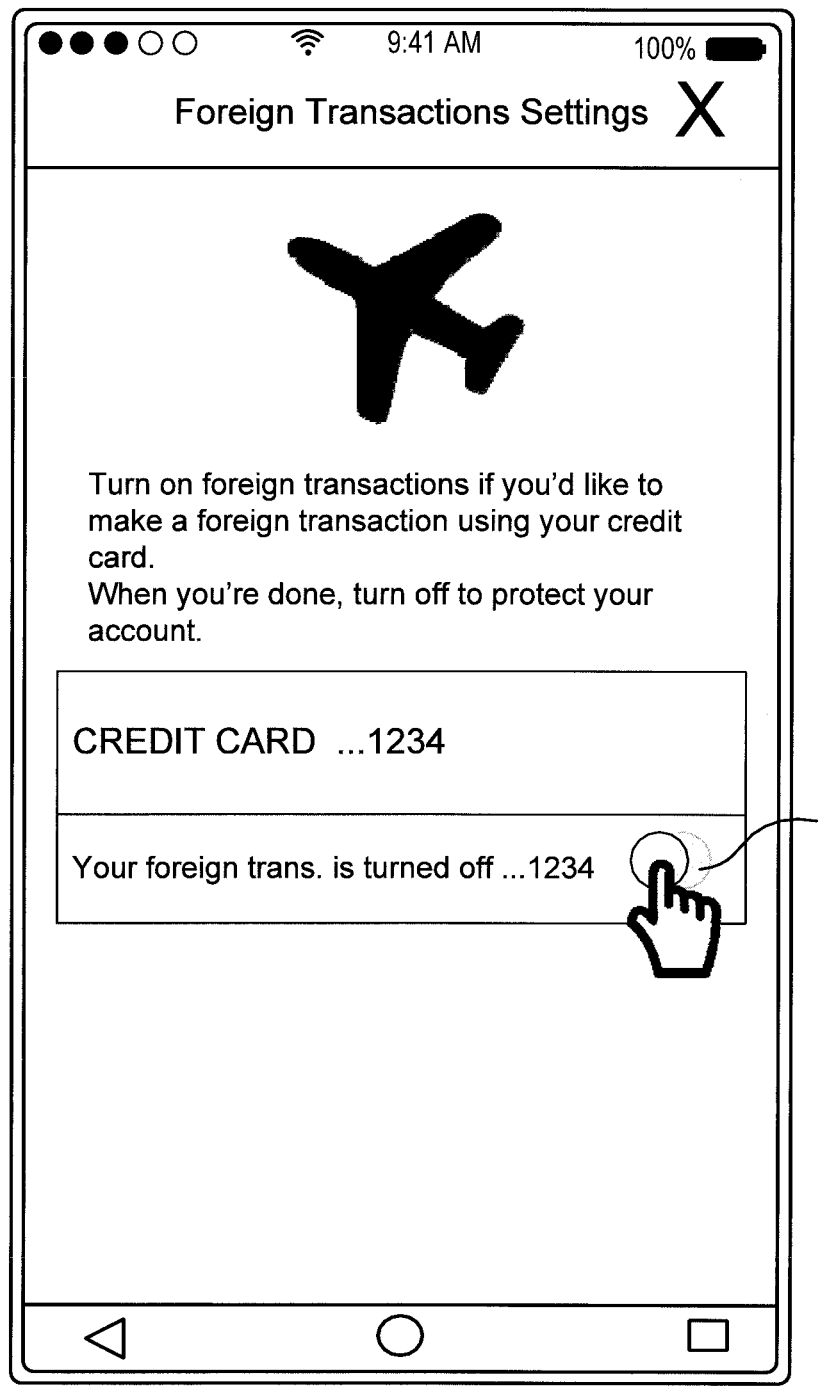

FIG. 3E shows an exemplary transitionary state in which user 110 is making a selection on switch 346 to turn on the foreign transaction feature, where the user action is represented by a hand-shaped cursor pointing to switch 346.

Figure 3F:
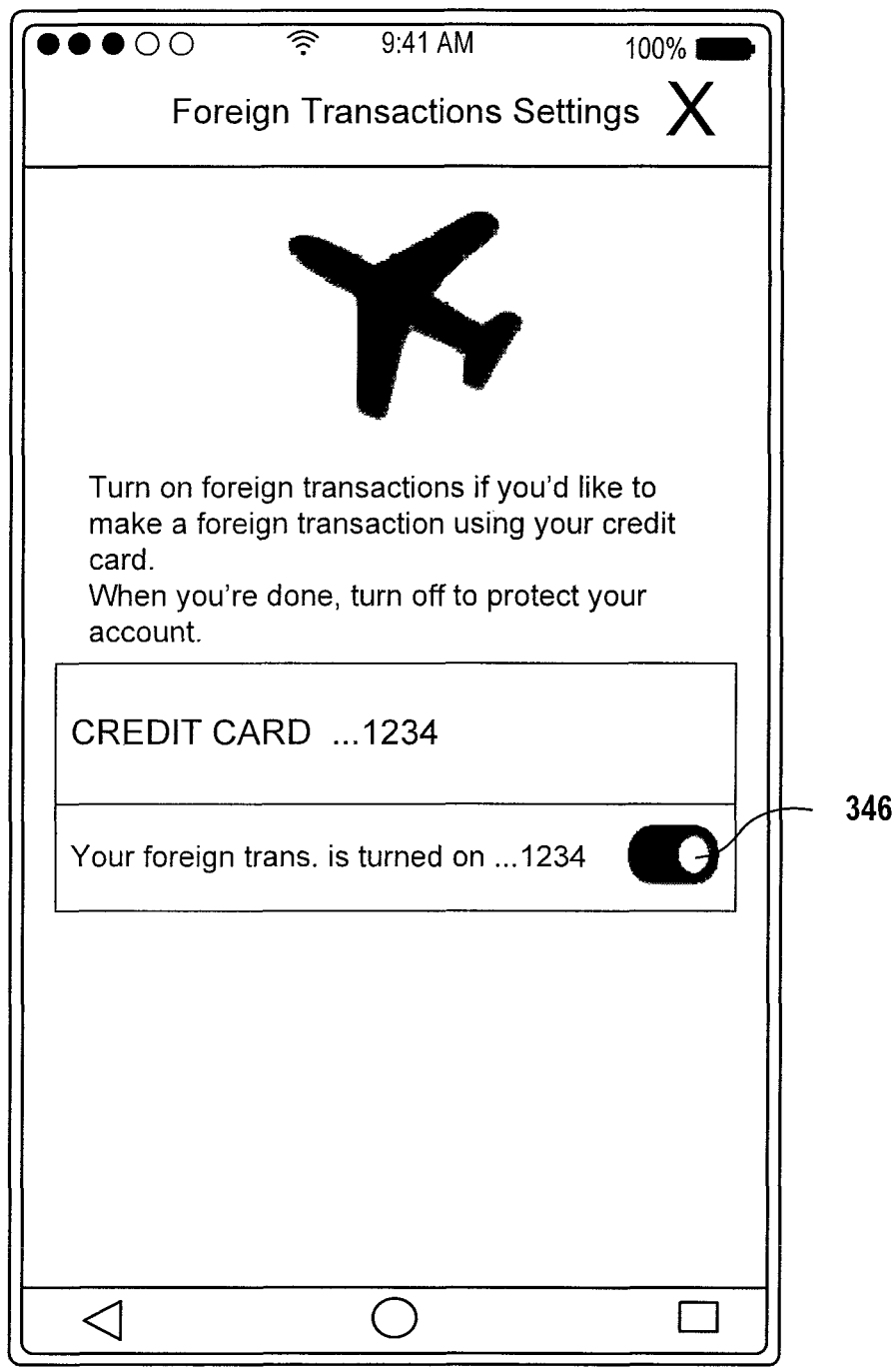

FIG. 3F shows an exemplary steady state after the user turns on the foreign transaction feature. As shown in FIG. 3F, the switch is now at its "ON" position, and the word indication reads "Your foreign trans. is turned on."

Figure 3G:
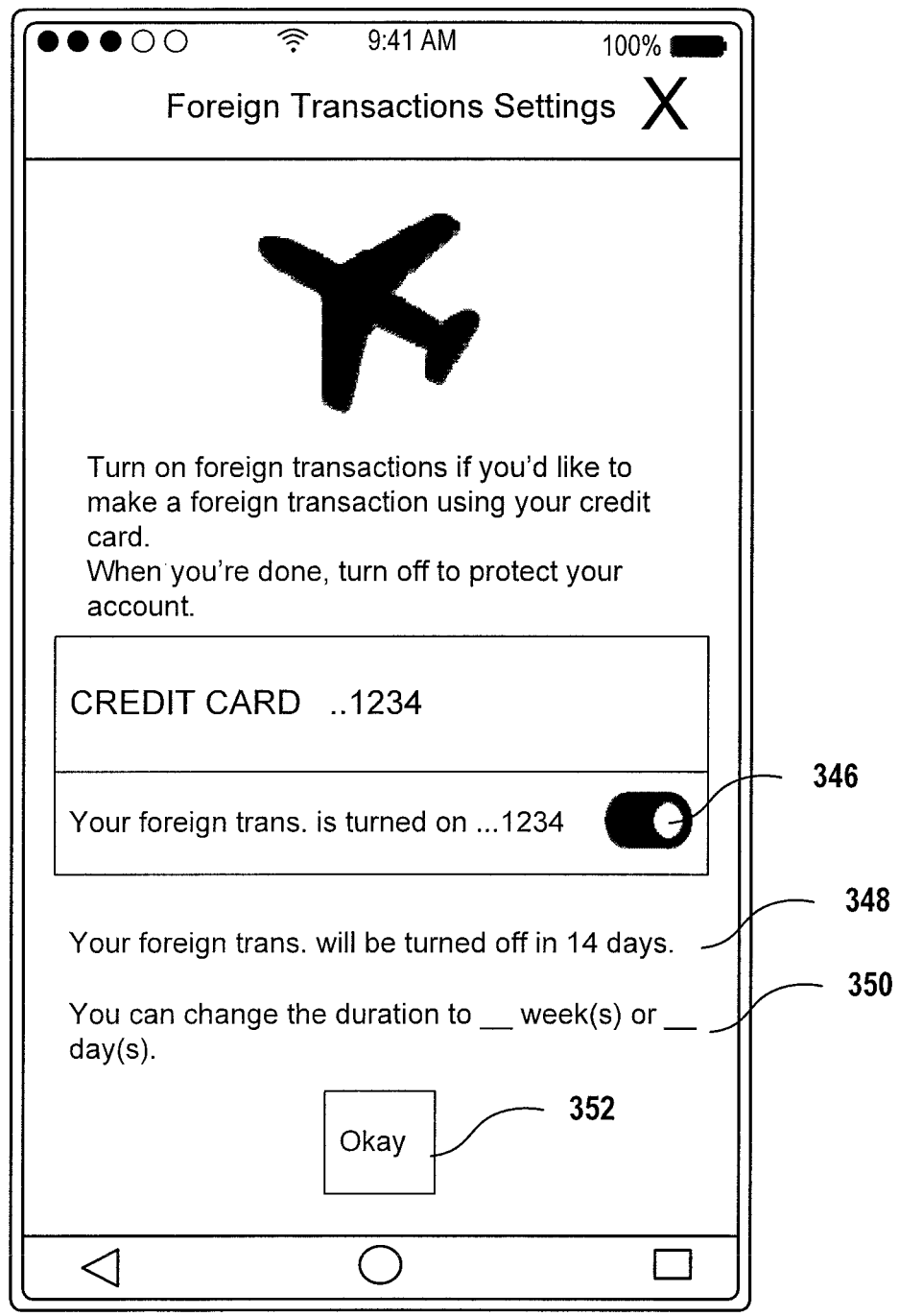

In some embodiments, the foreign transaction feature can be turned on for a predetermined time period. For example, the predetermined time period can be specified by a number of hours, days, weeks, or any combination thereof. In some embodiments, a count-down timer may be initiated once the foreign transaction feature is turned on, and the remaining time in which the foreign transaction feature stays enabled may be provided to user 110 through user interface 300. In some embodiments, an expiration time may be set and the remaining time can be determined based on the expiration time and the current time. FIG. 3G shows an exemplary implementation in which the remaining time 348 is displayed together with switch 346. In some embodiments, the count-down timer and/or expiration time may be maintained by one or more servers in the FSP system 130. The remaining time data may be downloaded from the server(s) by user device 112 and synchronized with the count-down timer and/or expiration time maintained at the server side.

In some embodiments, the time window or time duration in which the foreign transaction should be turned on may be set by user 110. For example, when user 110 travels to one or more foreign countries, the time duration in which foreign transactions may be needed can be precisely or roughly determined based on, for example, the itinerary or travel schedule of user 110. In this case, user 110 may wish to enable the foreign transaction feature based on his/her specific needs. FIG. 3G shows an exemplary implementation of the application user interface to allow user 110 to specify the time duration. As shown in FIG. 3G, user 110 may be informed by message 348 displayed in the user interface of the remaining time the foreign transaction feature remains enabled. User 110 may also specify the time duration by inputting the number of weeks or days into the input field(s) of message 350 to update the time duration. User 110 may set the new time duration by clicking the Okay button 352. User device 112 may then communicate with FSP system 130 to update the time duration information. For example, after receiving the new time duration information, FSP system 130 may update the timer and/or expiration time maintained on the server side.

User 110 may specify the time duration in other ways. For example, user 110 may specify the starting date/time and ending date/time to set the time duration. In another example, user 110 may specify the starting date/time and the number of days and/or weeks during which the foreign transaction feature should be turned on. In both cases, the foreign transaction feature may be turned on at a future time point. In some embodiments, user 110 may specify the time duration during which the foreign transaction feature should be turned on in a specific foreign country or region. For example, if user 110 plans to visit France from April 20 to April 23, then fly to Italy on April 23 and stay there till April 28, user 110 may then set to enable foreign transactions only in France from April 20 to April 23 and only in Italy from April 23 to April 28.

In some embodiments, when user 110 purchases travel-related products, such as airline tickets, using payment card 114, travel information such as the departing and returning date/time may be available to FSP system 130 based on information associated with the purchase transaction. In this case, FSP system 130 may suggest the time duration and/or geographic area(s) user 110 may likely need the foreign transaction service, and provide the suggestion to user 110 through the application user interface displayed by user device 112. User 110 may then accept the suggestion or make any desirable modifications.

Figure 3H:
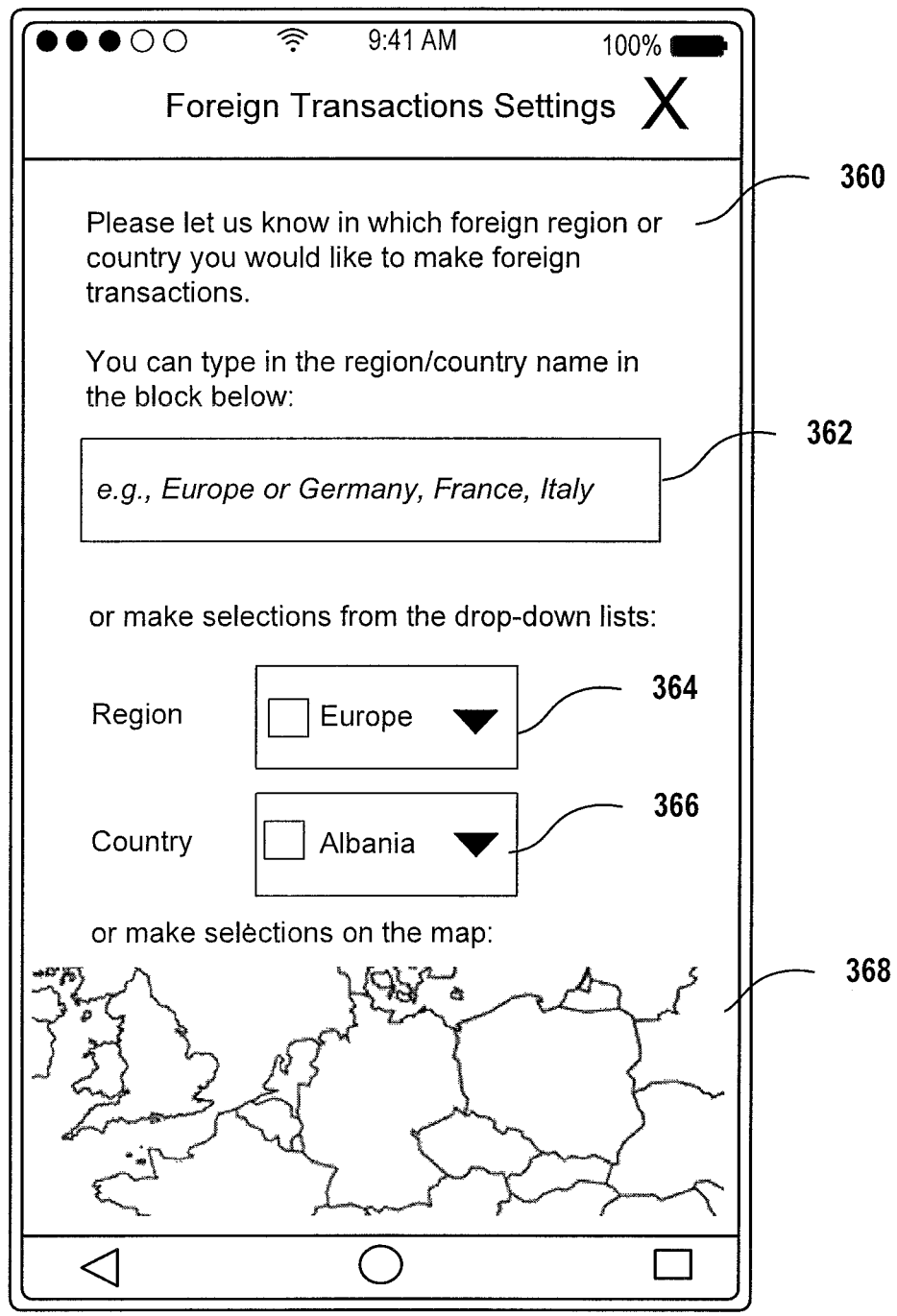

User 110 may specify the geographic area(s) where the foreign transaction feature should be enabled. FIG. 3H shows an exemplary application user interface 360 to allow user 110 to specify the geographic area(s). Referring to FIG. 3H, interface 360 may include an input box 362 to receive user inputs of the name of one or more regions and/or countries, where user 110 wishes to turn on the foreign transaction feature. User 110 may input one or more country names, such as Germany, France, Italy, etc. User 110 may also input one or more region names, such as Europe, West Europe, Middle East, Scandinavia, Middle East, East Asia, etc. FSP system 130 may maintain a list of countries that corresponds to each specified region according to generally accepted definition of the region.

As used herein, the term "country" broadly refers to a geographic area corresponding to a cognizable unit is a world division system, not necessarily corresponding to an independent sovereign state or nation. For example, a country may refer to a geographic area corresponding to a "country code" included in a financial transaction authorization request. In another example, a country may refer to a geographic area corresponding to a "country code" in an international telephone system. In this case, while United States and Canada are two nations, both use country code "1" in the international telephone system. Therefore, in some embodiments, United States and Canada may be treated as the same "country." For example, when a user uses a credit card issued by a US card issuer to make purchase in Canada, the purchase transactions may be treated as domestic transactions rather than foreign transactions.

Referring back to FIG. 3H, when user 110 input a country/region name into box 362, user device 112 and/or FSP system 130 may provide contextual information to assist user 110 to specify the geographic area selection. For example, a list of suggested country/region names may be provided as user 110 is inputting text. The suggestion may be provided via auto-completion, drop-down menu, or any other suitable means. When user 110 inputs a region name, user device 112 and/or FSP system 130 may provide to user 100 information about the countries included in that region. User 110 may confirm the region after reviewing the country information, change to another region by retyping or correcting the region name, or pick and choose specific countries from a list of included countries on-the-fly.

User 110 may also select one or more countries/regions using a drop-down menu or list. For example, interface 360 may provide a region selection drop-down list 364 and a country selection drop-down list 366. User 110 may select one or more regions/countries by, for example, checking the check box associated with specific regions/countries, from the drop-down list(s).

User 110 may also select one or more countries/regions using a mini map 368. For example, user 110 may select the desirable regions/countries by selecting the corresponding areas on map 368. Each selected region/country may be highlighted or rendered in a different color from the unselected ones.

While FIG. 3H provides three options for user 110 to make geographic area selections, other ways of choosing, selecting, or inputting geographic area information may also be implemented. In addition, some embodiments may provide a single means to input such information; other embodiments may provide multiple ways, such as the example shown in FIG. 3H. Further, the geographic area information may be input in a separate user interface from the interface for inputting time duration, such as the example shown in FIGS. 3G and 3H. In other embodiments, inputting of geographic area information may be combined with the inputting of time duration information in a single user interface.

Figure 4A:
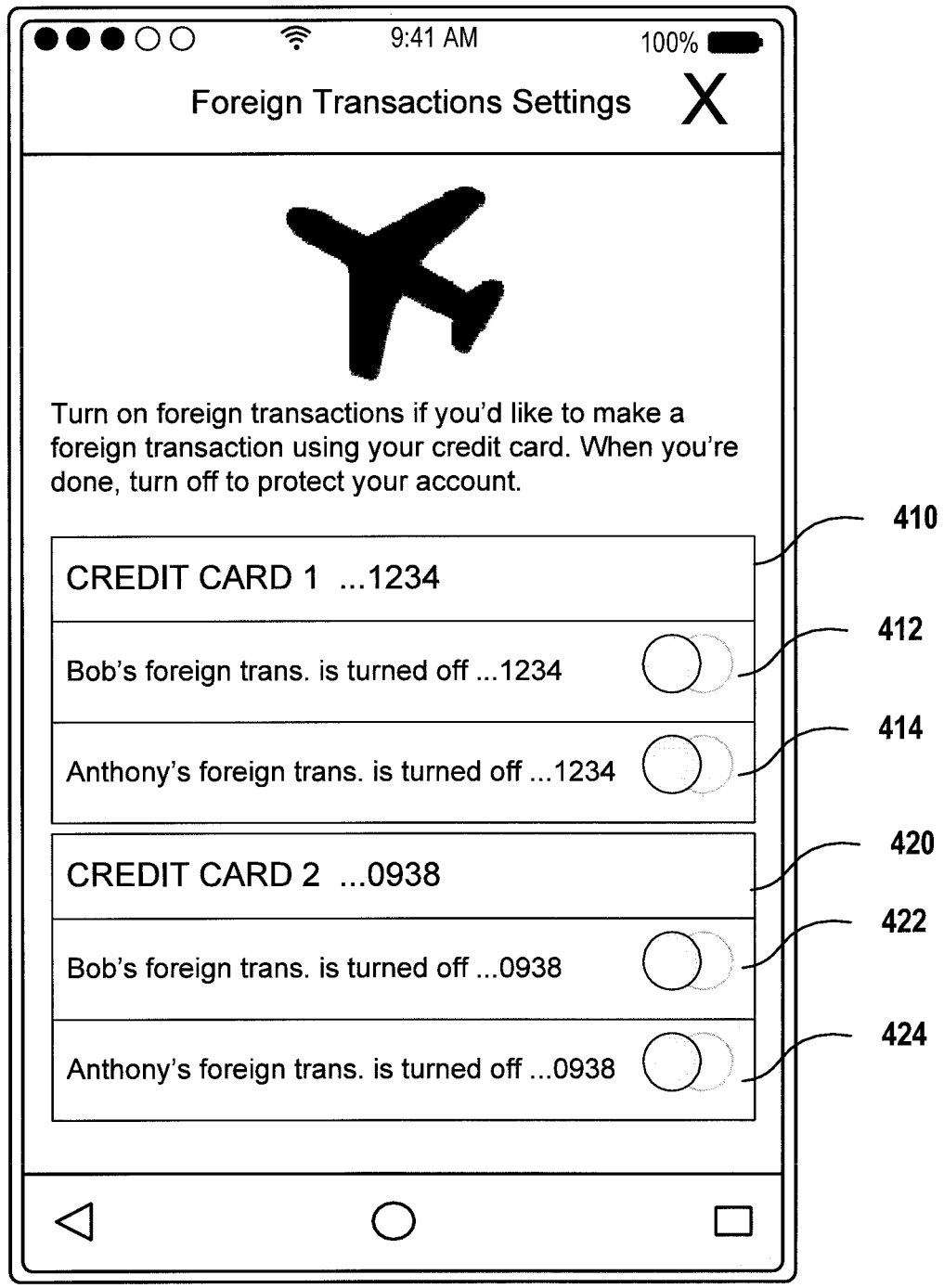
FIGS. 4A-4C are examples of other user device interfaces configured to receive user inputs to manage a foreign transaction service, consistent with the disclosed embodiments.
Figure 4B:
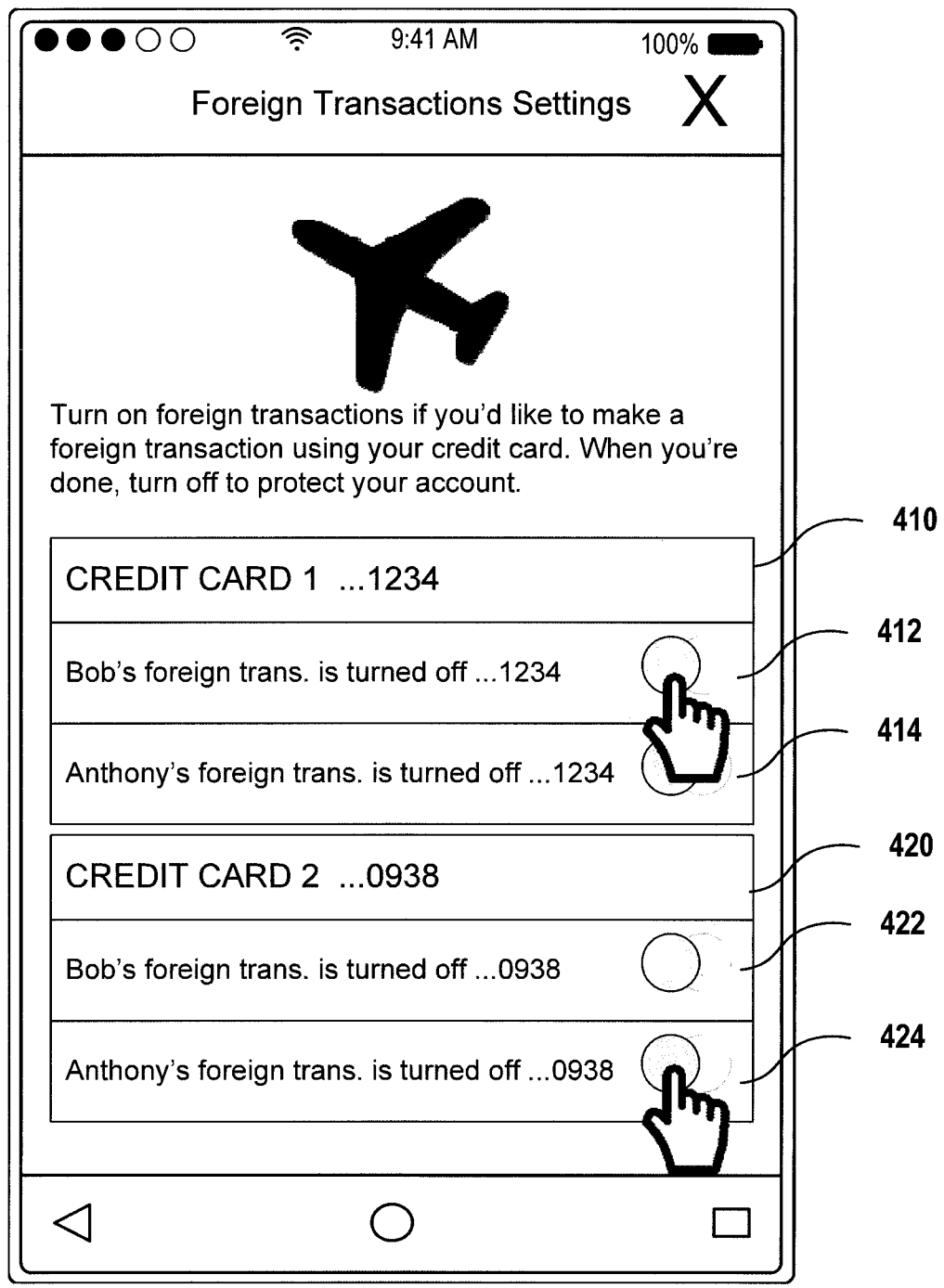
Figure 4C:
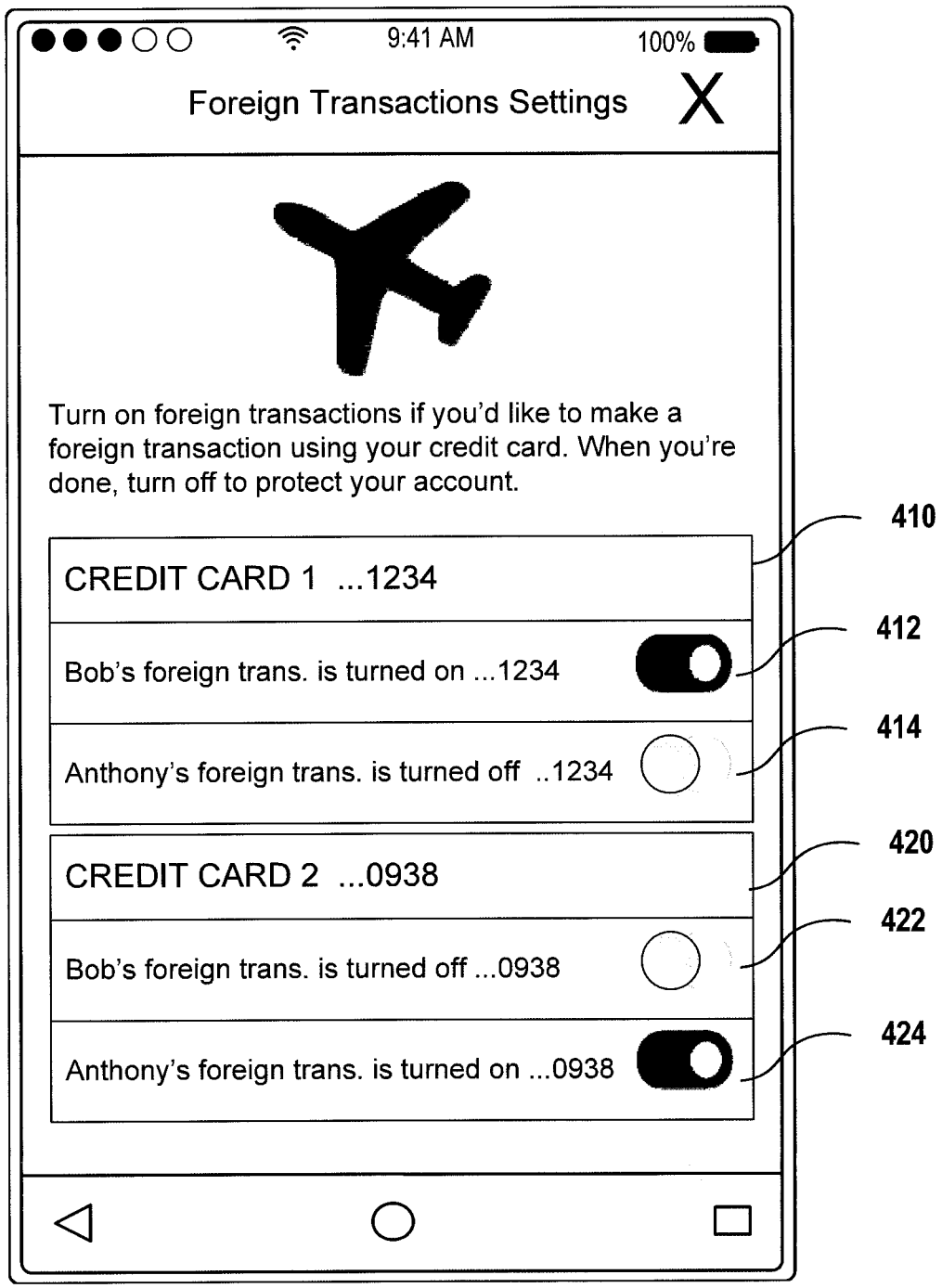

In some embodiments, the foreign transaction feature may be managed for multiple payment accounts and/or for multiple authorized users of each payment account. FIGS. 4A-4C shows an exemplary interface configured to receive user inputs to enable or disable the foreign transaction feature for individual payment accounts and/or individual authorized users. As shown in FIG. 4A, the Foreign Transaction Settings may include multiple foreign transaction management tools (e.g., 410 and 420), each corresponding to an individual payment account (e.g., credit card accounts having identification numbers respectively ending in "1234" and "0938"). In addition, a switch may be provided for each authorized user under each payment account. For example, for payment account 1 with an identification number ending in "1234," switch 412 may control one authorized user's foreign transaction setting (e.g., enabled or disabled), and switch 414 may control another authorized user's foreign transaction setting. Similarly, for payment account 2 with an identification number ending in "0938," switch 422 may control a first authorized user's foreign transaction setting, and switch 424 may control a second authorized user's foreign transaction setting.

FIG. 4B shows an exemplary interface in which user inputs are received to enable individual authorized user's foreign transaction feature. As shown in FIG. 4B, user inputs, indicated by hand-shaped cursors, are received to turn on the foreign transaction features for Bob's credit card account 1 and Anthony's credit card account 2.

FIG. 4C shows an exemplary interface showing that the foreign transaction features are turned on for Bob's and Anthony's corresponding credit card accounts, indicated by the phrases proceeding their respective switches 412 and 424, both of which are at the "ON" position.

Figure 5A:
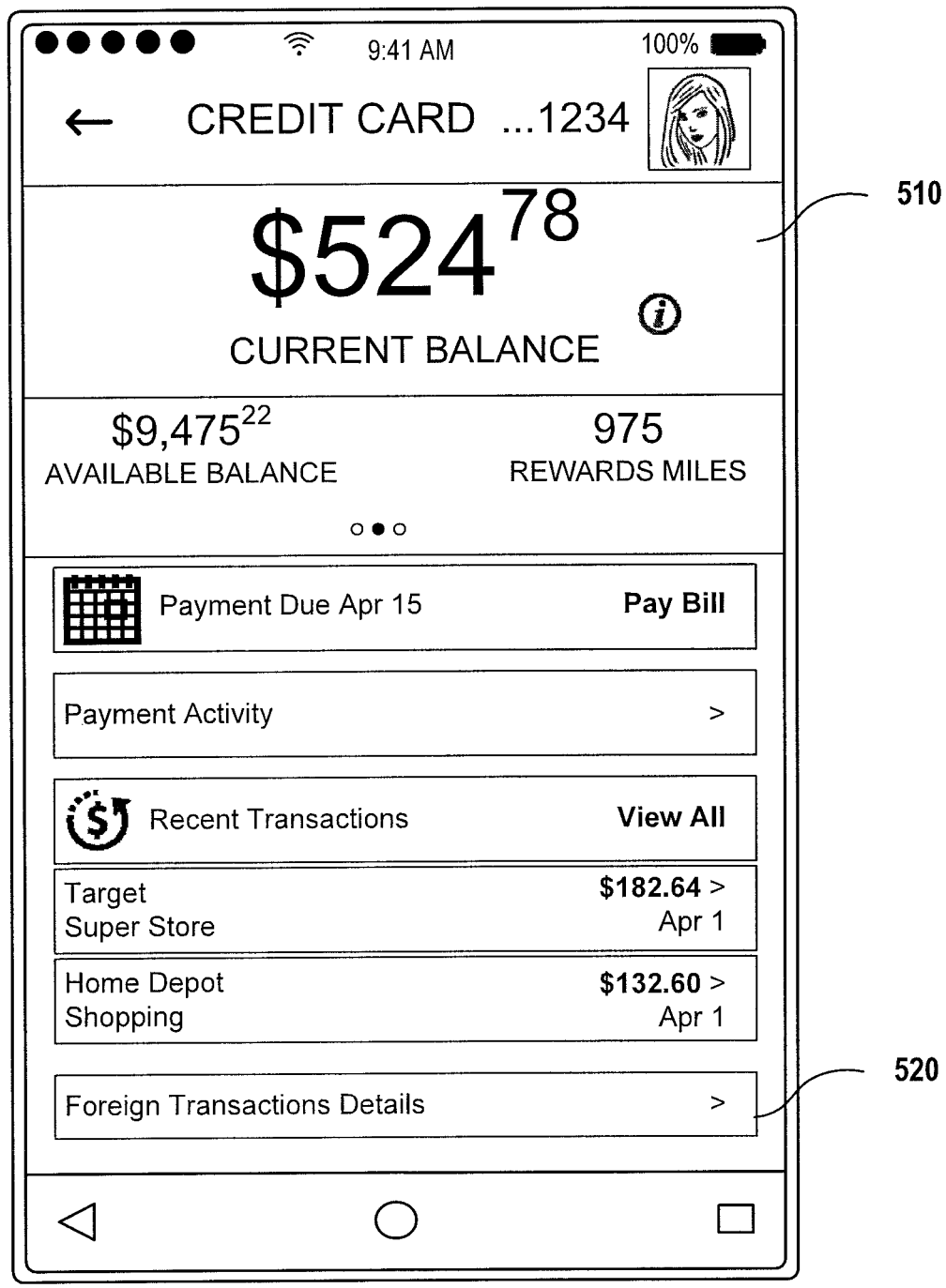
FIGS. 5A-5C are examples of additional user device interfaces configured to receive user inputs to manage a foreign transaction service, consistent with the disclosed embodiments.
Figure 5B:
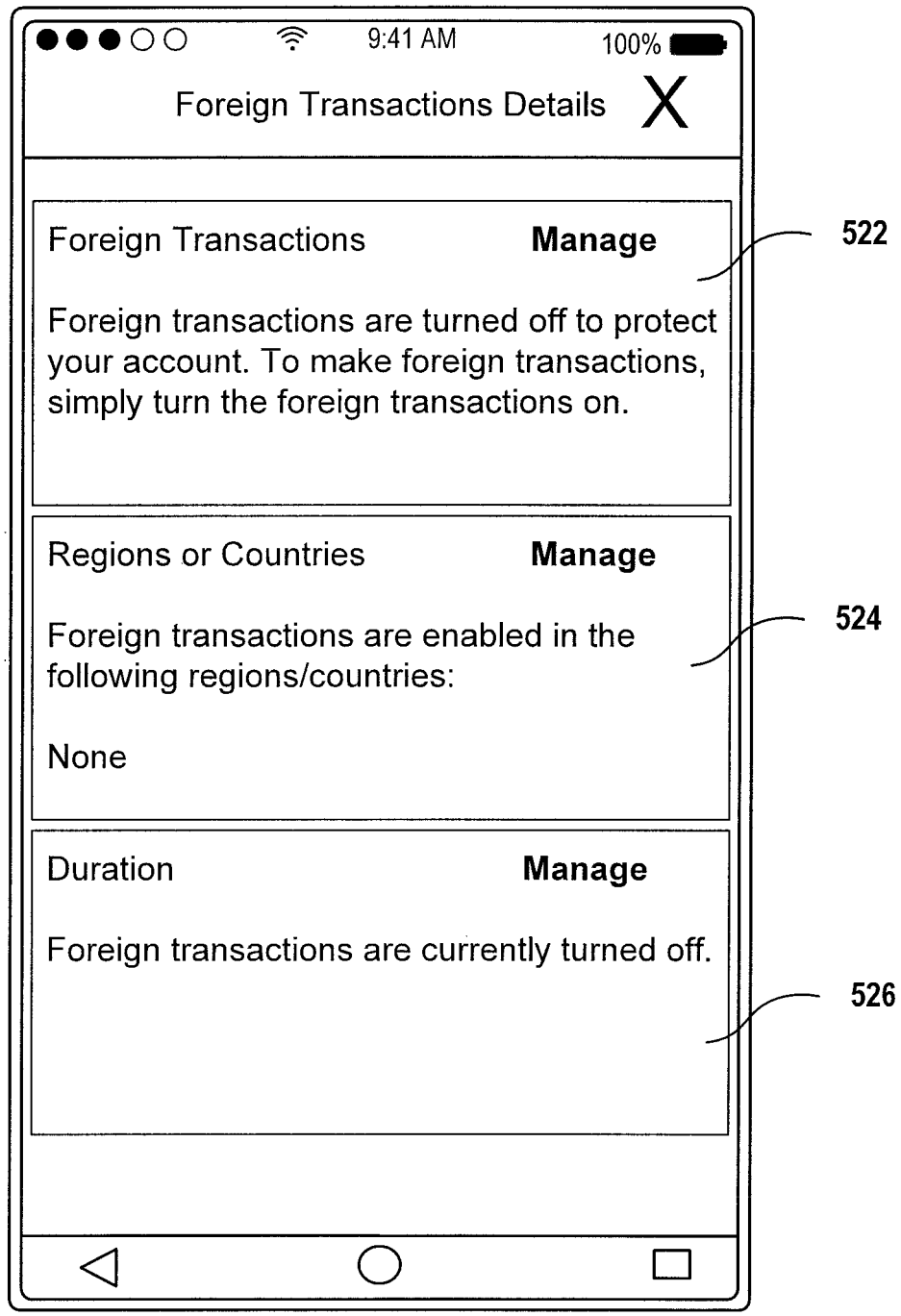

Foreign transaction settings can also be accessed through the user interface at an individual payment account level. FIG. 5A shows an exemplary interface 510 showing a Foreign Transaction Details menu option. In some embodiments, interface 510 may be accessed by selecting Credit Card menu option 312 shown in FIG. 3A. Returning to FIG. 5A, after receiving a user input to select the Foreign Transaction Details option, a Foreign Transaction Settings interface may be displayed, as shown in FIG. 5B. The Foreign Transaction Settings interface may include a foreign transaction management option 522, foreign transaction geographic area management option 524, and foreign transaction time duration management option 526. User 110 may select the foreign transaction management option 522 to access the foreign transaction manage tool, such as interface 340 shown in FIG. 3D, to enable or disable the foreign transaction feature. User 110 may select the foreign transaction geographic area management option 524 to access the geographic area setting interface, such as interface 360 shown in FIG. 3H, to specify in which geographic area(s) the foreign transaction feature should be enabled. User 110 may also set or change the time duration in which the foreign transaction feature should be enabled using the time duration management option 526. For example, user 110 may access a time duration setting tool such as 350 shown in FIG. 3G. In another example, user 110 may access a calendar to choose the starting date, ending date, and/or time span to specify the time duration.

Figure 5C:
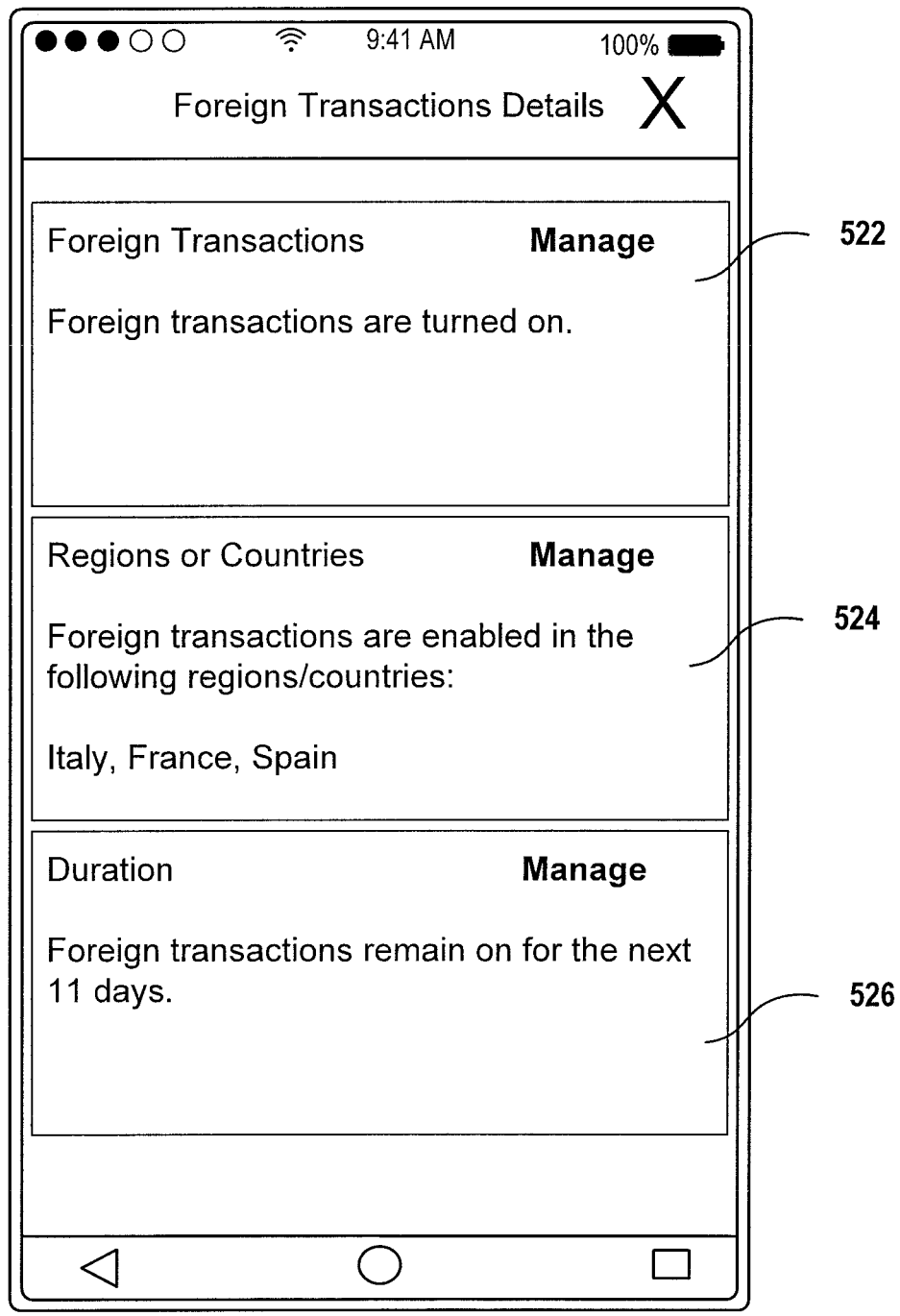

FIG. 5C shows foreign transaction information displayed to user 110 after the foreign transaction feature is enabled. Option 522 may include an indication that the foreign transaction feature is enabled. Option 524 may include a list of countries and/or regions where the foreign transactions are permitted. Option 526 may include the remaining time during which foreign transactions are permitted. User 110 may access any of these options to make changes to the foreign transaction feature, such as turn on or off the foreign transaction feature, specifying geographic area(s), and/or specifying the time duration.

In some embodiments, the foreign transaction feature may be disabled by default to reduce the risk of exposing a user's payment account to fraudulent activities. In this case, user 110 must turn on the foreign transaction feature before any foreign transaction can be approved. If, for example, a foreign transaction authorization request is received by FSP system 130 but FSP system 130 determines that the foreign transaction feature is not enabled, the foreign transaction authorization request is declined. FSP system 130 may provide instructions to user device 112 to display an alert notifying user 110 that a foreign transaction request has been declined. In some embodiments, user 110 may be provided with the control option to turn on the foreign transaction feature after the initial foreign transaction request is declined.

Figure 6A:
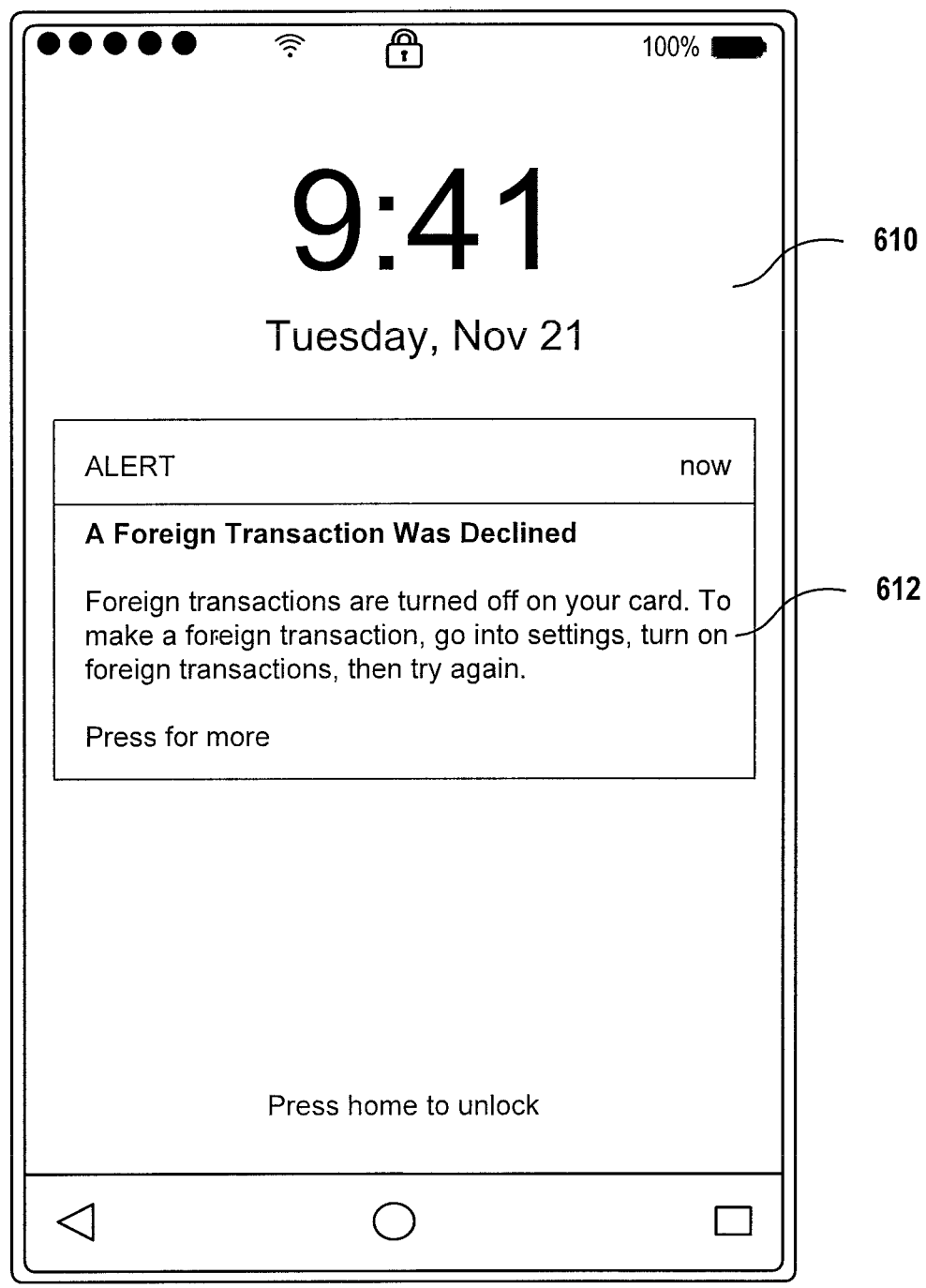
FIGS. 6A-6F are examples of another user device interface configured to receive user inputs to manage a foreign transaction service, consistent with the disclosed embodiments.

FIGS. 6A-6D show exemplary user interfaces implementing the above-described alerting and controlling function. FIG. 6A shows an interface displaying an alert message 612 informing the user that a foreign transaction request is declined because the foreign transaction feature is turned off. In some embodiments, alert message 612 may be displayed on a lock screen 610 of user device 112, so that user 110 may receive the alert even if the user is not logged in to the mobile application or a website associated with the user's payment account. The user may be provided with a control option to turn on the foreign transaction feature by, for example, pressing the alert message, as shown in FIG. 6A. Specifically, after the user presses alert message 612, an interface shown in FIG. 6B may be displayed, in which a message 620 is provided to the user inquiring whether to turn on the foreign transaction feature. The user may choose turn on the foreign transaction feature by pressing button 622, or keep the foreign transaction feature turned off by pressing button 624.

Figure 6B:
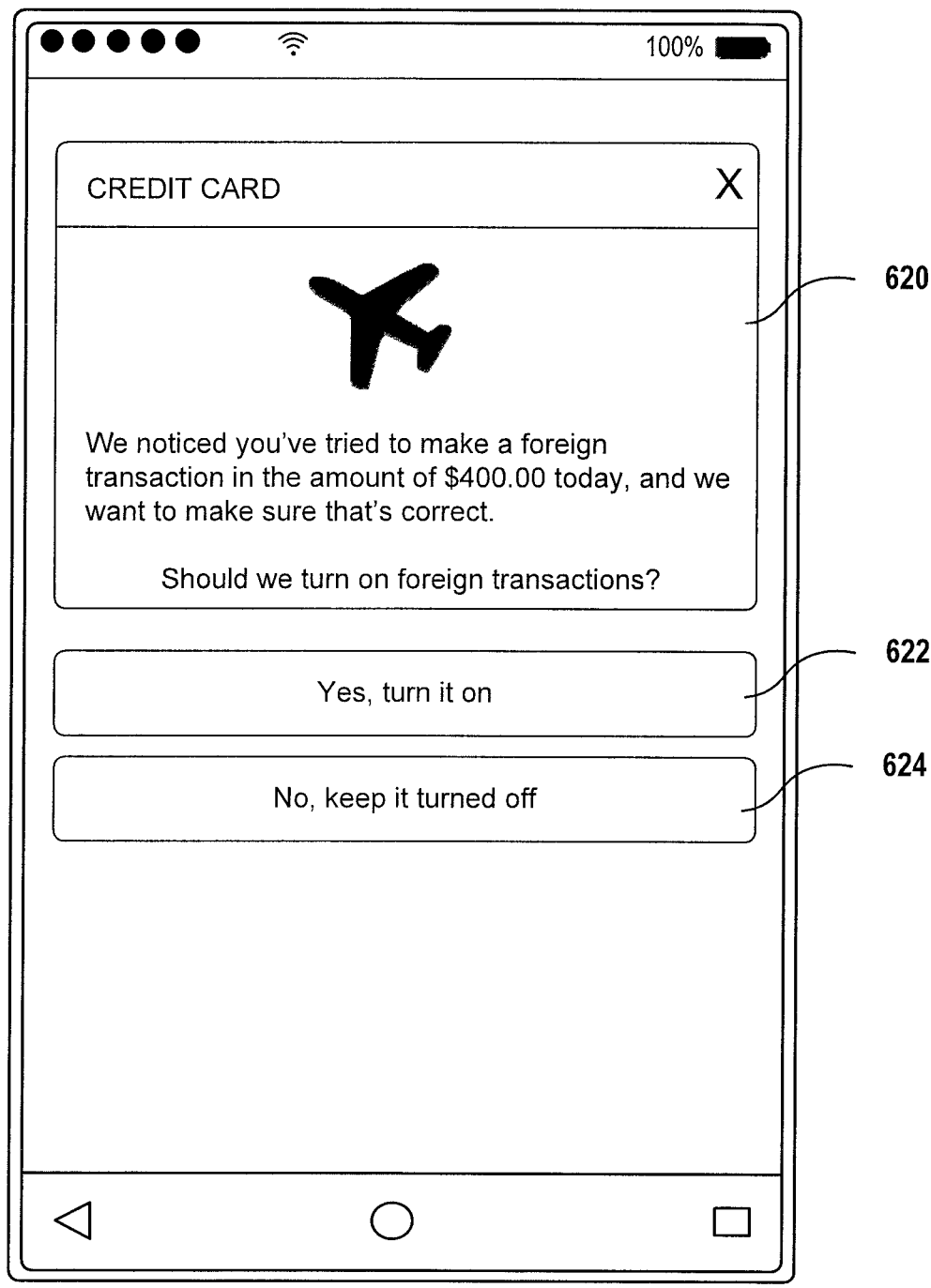
Figure 6C:
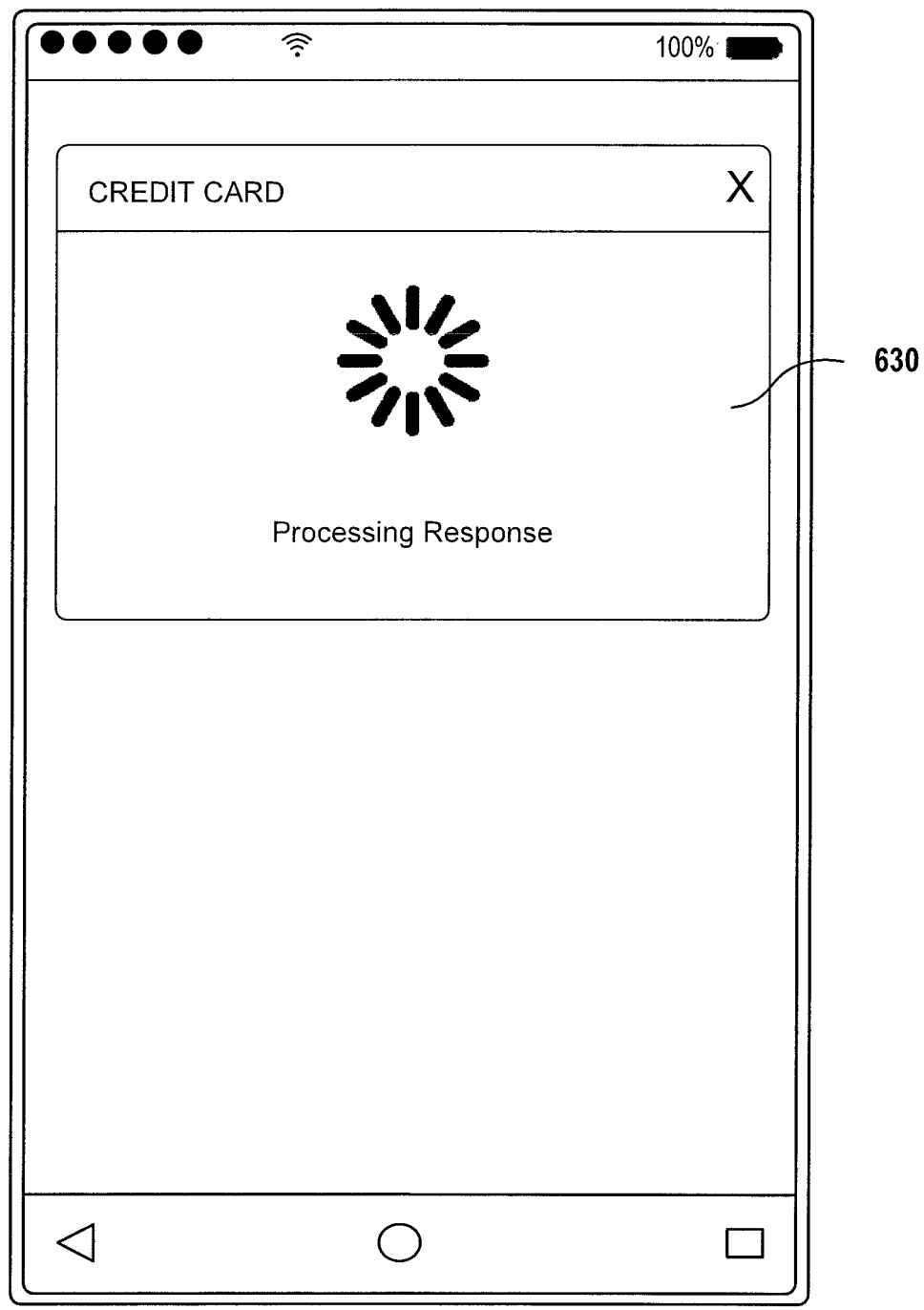
Figure 6D:
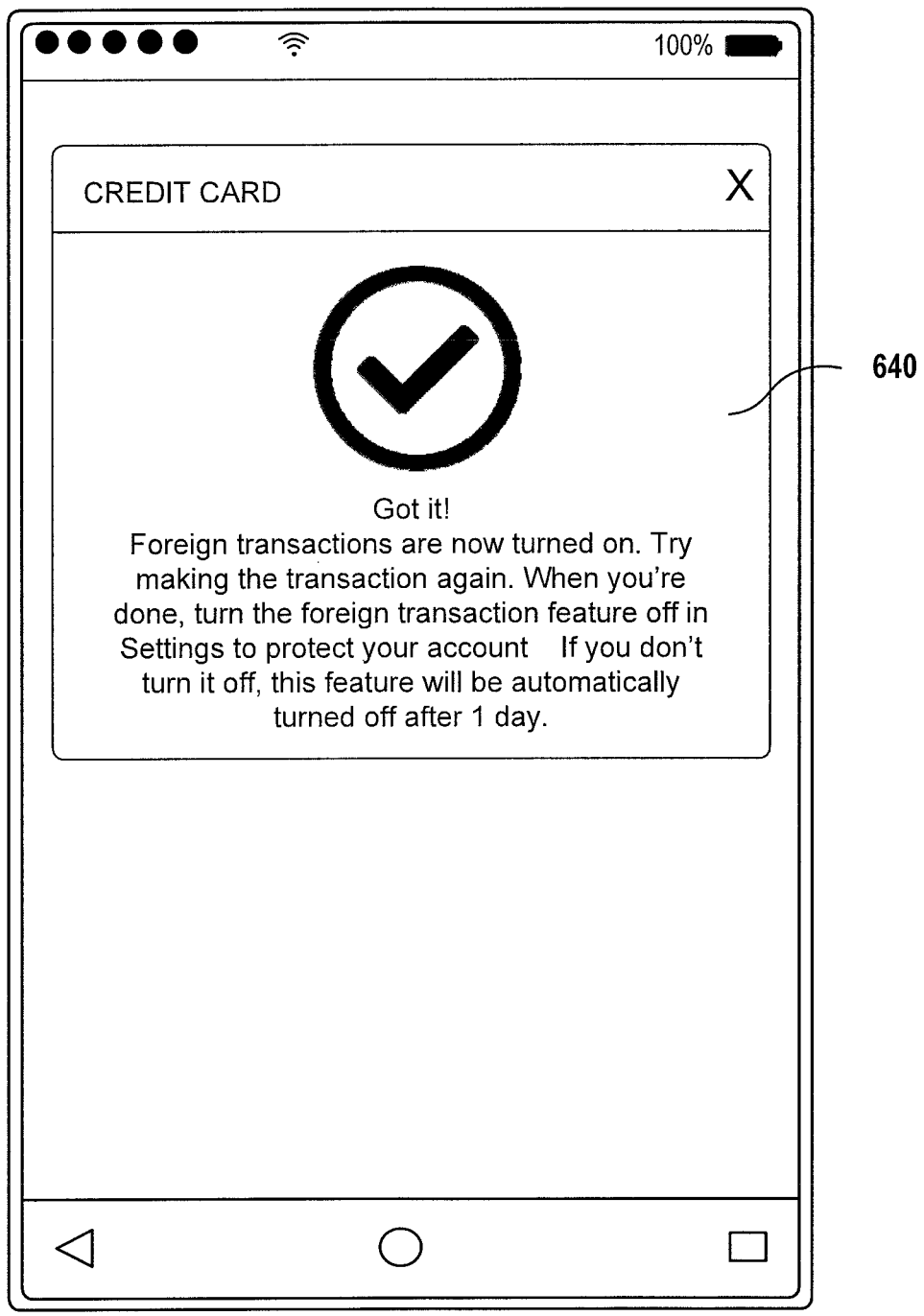

In some embodiments, the interface shown in FIG. 6B may be provided only after authentication of the user identity, for example, by verifying a password, a confidential graphical pattern, a fingerprint, a facial feature, etc. If the user selects button 622 to turn on the foreign transaction feature, an interface shown in FIG. 6C may be displayed showing a message indicating that the request to enable foreign transaction feature is being processed. As shown in FIG. 6D, after the foreign transaction feature is successfully enabled, a message 640 may be displayed informing the user that the foreign transaction feature is enabled, as well as other related information such as the duration in which the foreign transaction feature stays enabled and a recommendation to turn off the foreign transaction feature proactively to protect the account.

In some embodiments, FSP system 130 may provide instructions to user device 112 to display a suggestion to user 110 to turn on the foreign transaction feature based on information obtained from financial transaction data associated with the user's payment account. For example, user 110 may use payment card 114 to make a purchase at a point-of-sale store such as a restaurant, a coffee shop, a duty-free store, etc. located at a travel portal such as an airport, a train station, a sea port, etc. The purchase transaction may initiate a transaction authorization request that is sent to FSP system 130 for approval. FSP system 130 may process the request according to any know method and may check the request for additional information such as merchant identification information, merchant location information (e.g., whether the merchant is located in a travel portal), merchant category information (e.g., whether the merchant is a retail store, a restaurant, a coffee shop, or other types of business), etc. Based on the information, FSP system 130 may determine whether the purchase was made at a travel portal.

Figure 6E:
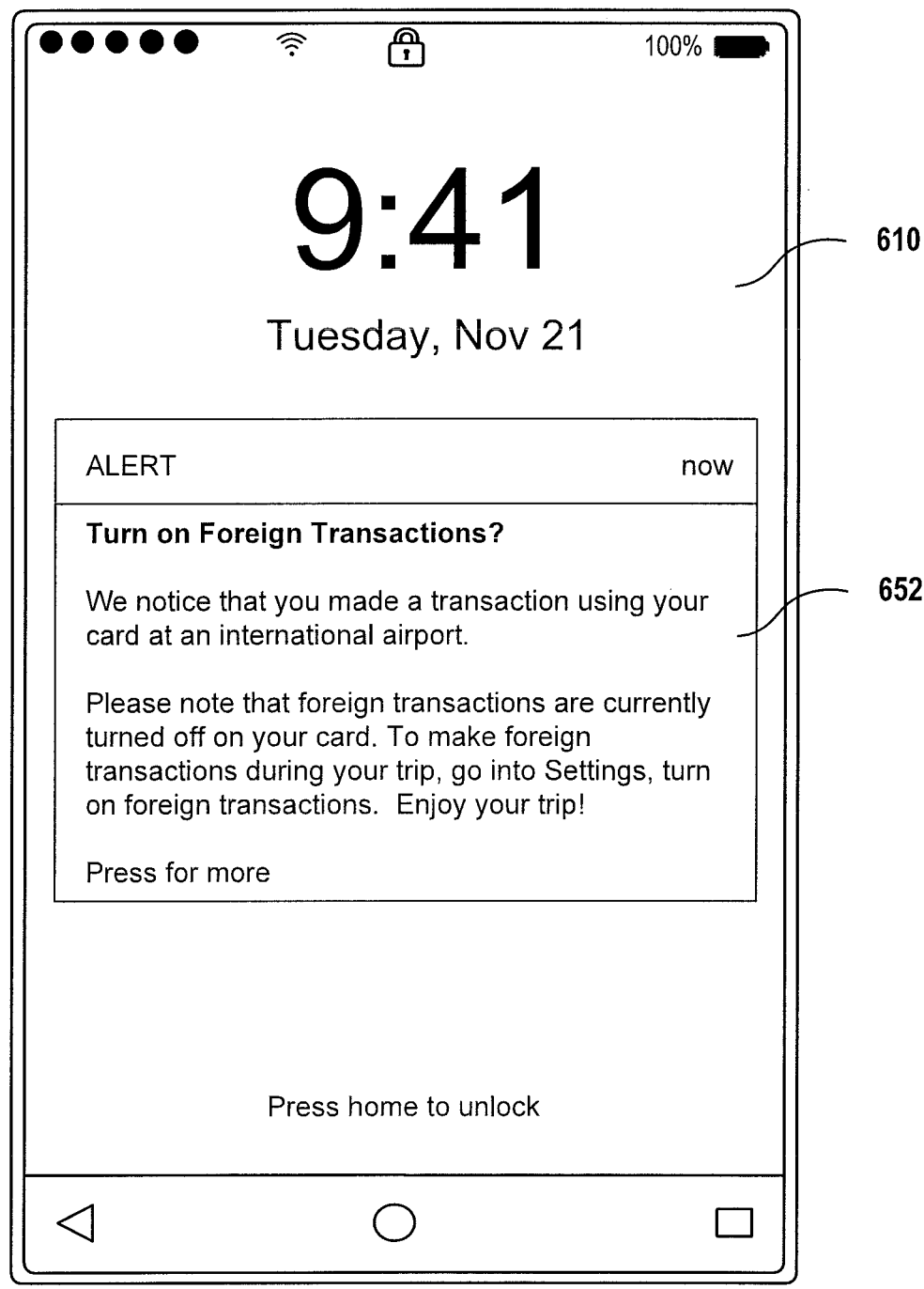

For example, FSP system 130 may determine that user 110 made a purchase at a duty-free store at an international airport based on the information extracted from the transaction authorization request, which may suggest that user 110 is likely to start an international trip. Based on this determination, FSP system 130 may provide a suggestion to user 110 to enable the foreign transaction feature associated with the user's payment account so that user 110 may use card 114 to purchase goods and/or service in a foreign country. FSP system 130 may provide the suggestion to user 110 via user device 112. FIG. 6E shows an exemplary application user interface alerting user 110 to turn on the foreign transaction feature. As shown in FIG. 6E, FSP system 130 may send instructions to user device 112 to display an alert 652 informing user 110 that the foreign transaction feature is currently turned off and may be turned on to provide enhanced convenience to the user's upcoming international trip. Similar to alert 612, alert 652 may be displayed on the lock screen 610 so that user 110 may receive the alerting information even if the user is not logged in to the mobile application or a website associated with the user's payment account. User 110 may press alert message 652 to enter into an interface similar to the one shown in FIG. 6B, in which user 110 may choose to turn on the foreign transaction feature or keep it turned off. The process is similar to what has been described above with respect to FIGS. 6B-6D.

In some embodiments, FSP system 130 may provide a suggestion to user 110 to turn on foreign transaction service after FSP system 130 determines that user 110 made a purchase at a travel website or a travel mobile application. As used herein, the term "travel portal" also includes these virtual places in addition to the actual physical places such as an airport or train station. For example, FSP system 130 may identify that a merchant charging user 110's payment account is a travel website such as an airline website, a lodging/hotel website, a travel agency website, etc., which may suggest that user 110 is likely planning a trip. In some embodiments, additional travel information may also be available to FSP system 130, such as air travel schedule, cruise ship itinerary, etc. FSP system 130 may further determine whether the travel would likely involve any foreign countries. Based on such determinations, FSP system 130 may provide a suggestion to user 110 to turn on the foreign transaction feature associated with the user's payment account.

Figure 6F:
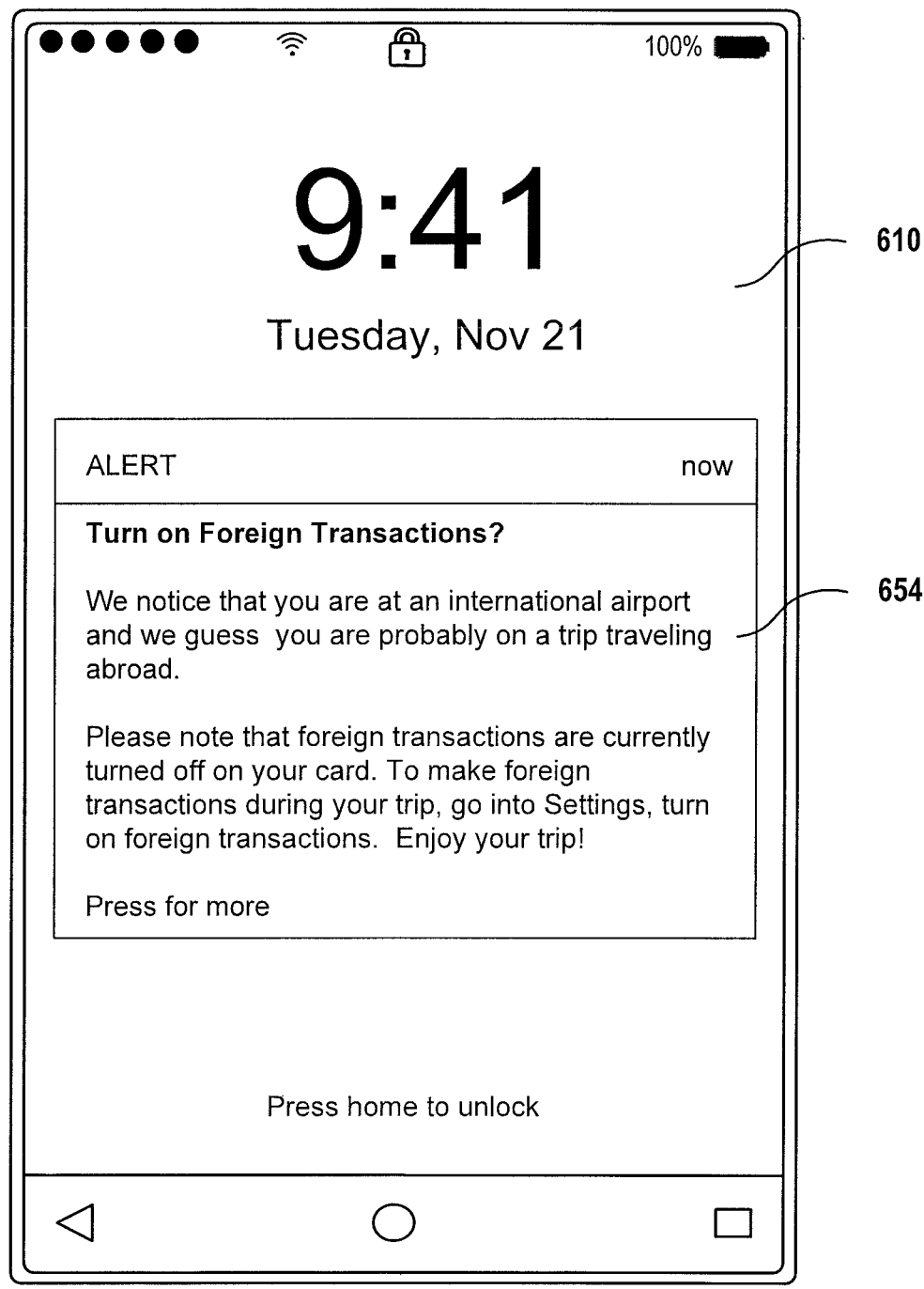

FIG. 6F shows another exemplary user interface suggesting user 110 to turn on foreign transaction service after FSP system 130 determines that user 110 is located at a travel portal, such as an airport, train station, sea port, etc. For example, user 110 may carry user device 112, which may be equipped with a location sensor, such as a GPS sensor, a location sensor based on telecommunication signals and/or WiFi signals, etc., while traveling on an international trip. The location sensor may provide location information, and user device 110 may communicate the location information to FSP system 130 through, for example, network 140. In some embodiments, FSP system 130 may analyze the location information and determine whether the location information indicates a location that is within or in close proximity to a travel portal, such as an international airport. In some embodiments, user device 110 may determine, based on the location information, whether user 110 is located within or in close proximity to a travel portal, and if so, inform FSP system 130 about the determination. In any case, after FSP system 130 determines that user 110 is located at (including within and in close proximity to) a travel portal, either by analyzing the location information or by receiving an indication from user device 110, FSP system 130 may provide a suggestion to user 110 to turn on the foreign transaction feature associated with the user's payment account.

Referring to FIG. 6F, FSP system 130 may provide instructions to user device 112 to display an alert message 654 on lock screen 610, notifying user 110 to enable foreign transactions. User 110 may press the message 654 to enter a control interface such as the one shown in FIG. 6B, to enable foreign transactions or keep the foreign transaction feature turned off.

Figure 7:
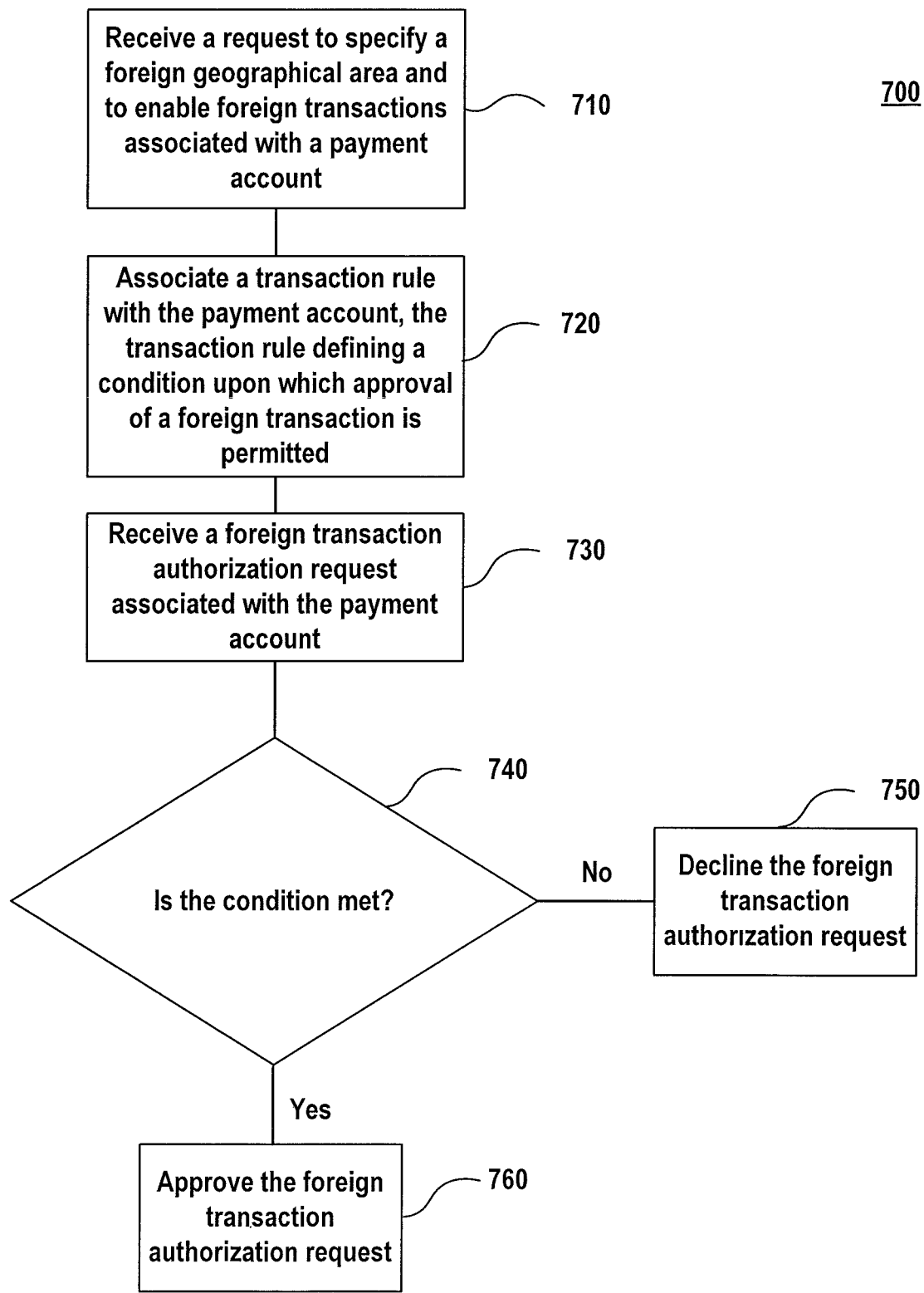
FIGS. 7, 8A, 8B, and 9 are flowcharts of exemplary processes for managing a foreign transaction service, consistent with the disclosed embodiments.

FIG. 7 shows an exemplary process 700 for managing a foreign transaction service or feature associated with a payment account of a user, such as user 110. FSP system 130 may provide instructions to user device 112 to display an application interface, such as interface 340, for receiving user request to specify a foreign geographical area and to enable and disable the foreign transaction service. In step 710, FSP system 130 may receive a request to specify a foreign geographical area and to enable the foreign transaction service associate with the payment account in the foreign geographical area. For example, user 110 may request a turn-on of the foreign transaction feature through user interface 340 (FIG. 3D) by switching the switch 346 to its "ON" position. User 110 may also specify the foreign geographical area(s) through the interface shown in FIG.

3H. FSP system 130 may then receive the enable request from user device 112 through network 140 and/or transaction processing network 145.

After receiving the enable request, FSP system 130 may, in response to the request, associate a transaction rule with the user's payment account in step 720. The transaction rule may define a condition upon which approval of a foreign transaction is permitted. For example, the condition may specify a window of time within with a foreign transaction authorization request can be approved, and the condition is met when the foreign transaction authorization request is received within the time window. In some embodiments, the time window may be specified by a timer, such as a count-down timer. In this case, the duration of the time window may be specified by the initial value of the timer, and the remaining time in which the foreign transaction service stays enabled can be measured by the current value of the timer. When the timer counts down to zero or within a predetermine range, the time window may be considered to be expired, which may indicate that the foreign transaction service is disabled, and subsequent foreign transaction requests may be declined.

In some embodiments, the time window may be specified by an expiration time. In this case, the time window may be indicated by the expiration time. For example, when a user requests to enable the foreign transaction service, an expiration time may be set by which approval of a foreign transaction authorization request can be permitted. When a foreign transaction authorization request is received, FSA system 130 may determine the time point of receiving the foreign transaction authorization request and compare the time point with the expiration time. FSA system 130 may determine that the condition is met when the foreign transaction authorization request is received before and/or within a predetermined range of the expiration time, and that the condition is not met when the foreign transaction authorization request is received after the expiration time.

In some embodiments, the timer and/or expiration time may be maintained by FSP system 130 for each payment account that has its foreign transaction feature enabled. Data indicative of the duration of the time window may be provided to user device 112 for displaying to user 110, as shown in message 348 of FIG. 3G. When a timer is used to measure the time window, the data provided to user device 112 may be synchronized with the timer.

In step 730, FSP system 130 may receive a foreign transaction authorization request associated with the payment account. For example, a user may initiate a foreign transaction at merchant system 120, and a foreign transaction authorization request may be initiated at the merchant system 120 and received by FSP system 130 through transaction processing network 145 and/or network 140.

After receiving the foreign transaction authorization request, FSP system 130, in step 740, may determine if the condition defined in the transaction rule associated with the payment account is met. For example, FSP system 130 may check if the time window allowing foreign transactions has expired. When the time window is specified by a timer, FSP system 130 may check whether the timer has counted down to zero or is within a predetermined range (e.g., a preset range within which the time window is considered to be expired). When the time window is specified by an expiration time, FSP system 130 may check if the foreign transaction authorization request is received after the expiration time.

In step 760, when the time window is not expired, indicating that the foreign transaction service is enabled, FSP system 130 may approve the foreign transaction authorization request by, for example, transmitting an approval response to the merchant system 120. If, however, the time window has expired, indicating that the foreign transaction service is disabled, FSP system 130 may decline the foreign transaction authorization request by, for example, transmitting a declining response to the merchant system 120, as shown in step 750.

The transaction rule may define various different conditions to manage the foreign transaction feature. For example, the condition may be a binary condition specifying whether the foreign transaction feature is enabled or disabled, which can be controlled by user 110 through an application interface display on user device 112. In another example, the condition may specify additional criteria for approving a foreign transaction. Such additional criteria may include a time-based condition (e.g., time window), a location-based condition (e.g., whether the transaction is initiated within a defined geographical area), and the like. The condition may be reset after a single foreign transaction is approved (e.g., forcing the condition not to be met for subsequent foreign transactions) or may stay valid for the entire specified time duration such that multiple foreign transactions may be approved.

Figure 8A:
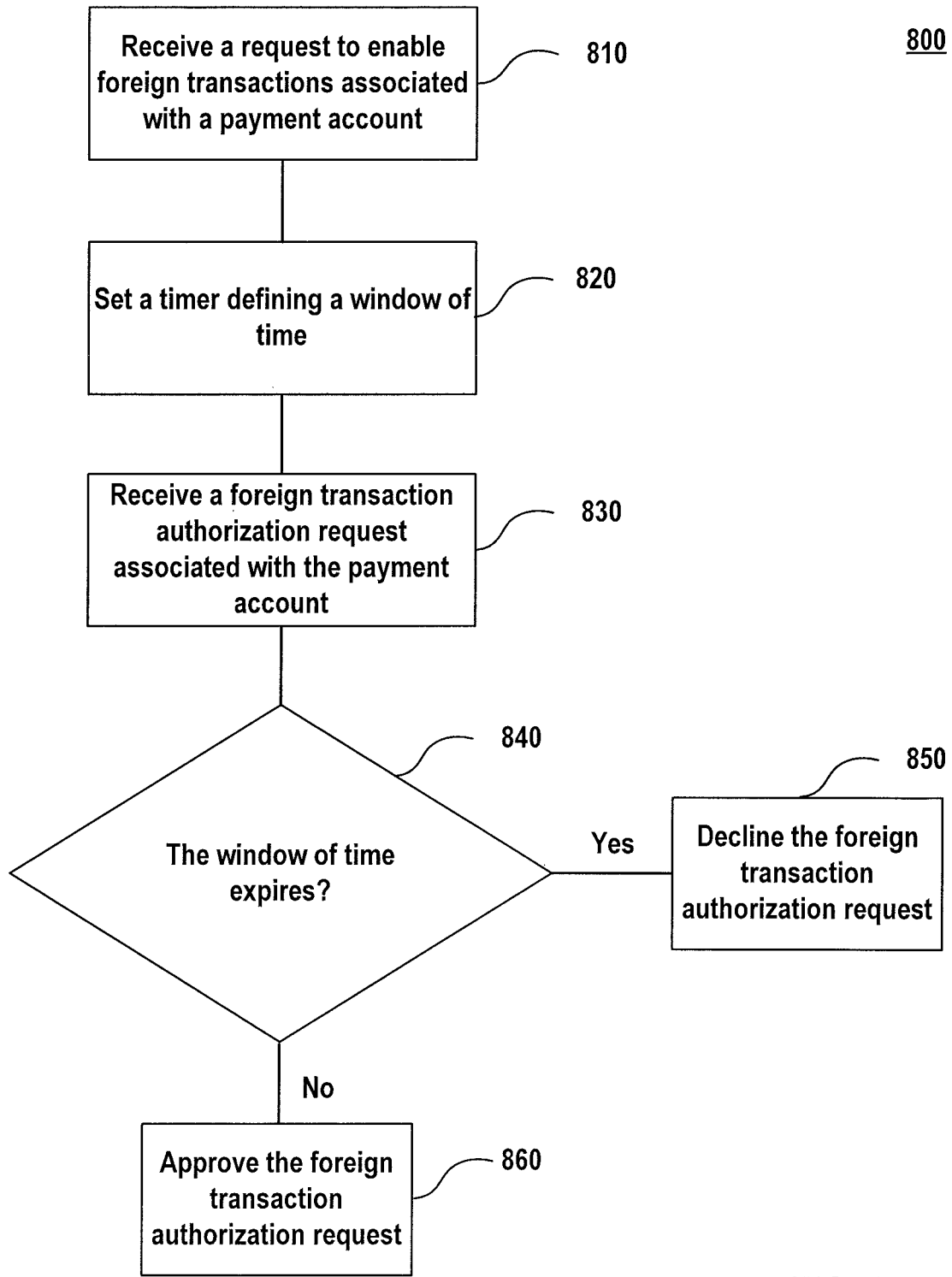

FIG. 8A is a flow chart of an exemplary process 800 utilizing a time window and timer as the condition to manage the foreign transaction service. In step 810, FSP system 130 may receive a request to enable foreign transaction service associated with a payment account of a user, such as user 110. Step 810 is similar to step 710. In step 820, FSP system 130 may set a timer defining a time window within which approval of foreign transactions is permitted. The timer may be set to be counting down from a predetermined initial value, such as 2 weeks, 1 week, 5 days, 24 hours, or any other values. The duration of the time window may also be set by user 110 through, for example, an application interface displayed on user device 112. Once set, the timer may start counting down. The initial and/or remaining time duration may be provided to be synchronized with user device 112 through network 140 such that user 110 may be informed of the remaining time window for conducting a foreign transaction. An exemplary implementation of the remaining time display is provided as a message 348 shown in FIG. 3G. FSP system 130 may also provide instructions to user device 112 for displaying an indication of whether the foreign transaction service is enabled or disabled, such as displaying the foreign transaction switch 346 in its "ON" position and/or the message proceeding the switch, as shown in FIG. 3G.

In step 830, FSP system 130 may receive a foreign transaction authorization request, similar to step 730. In step 840, FSP system 130 may determine if the time window has expired, indicating whether the foreign transaction service is enabled (e.g., when the time window does not expire) or disabled (e.g., when the time window expires). For example, FSP system 130 may check the timer and determine if the timer has counted down to zero or is within a predetermine range of expiration of the time window. In one implementation, a timer may be represented by a count-down number, indicating the remaining number of weeks, days, hours, etc., before the time window expires. FSP system 130 may compare the count-down number with zero. If the count-down number is not zero, then it indicates that the foreign transaction service remains enabled. Otherwise, it indicates that the foreign transaction service is disabled. When user 110 requests enabling of the foreign transaction service, FSP system 130 may set the count-down number to a predetermined value or a user-defined value, and start the counting down. When user 110 requests disabling the foreign transaction service, FSP system 130 may reset the count-down number to zero. In this case, the value of the count-down number may be used as an indication of whether the foreign transaction service is enabled or disabled. Managing the foreign transaction service may be achieved by controlling or modifying the count-down number associated with the payment account.

In step 840, after FSP system 130 makes a determination as to whether the time window has expired, FSP system 130 may, in step 860, approve the foreign transaction authorization request when the time window has not expired, or, in step 850, decline the foreign transaction authorization request when the time window has expired.

Figure 8B:
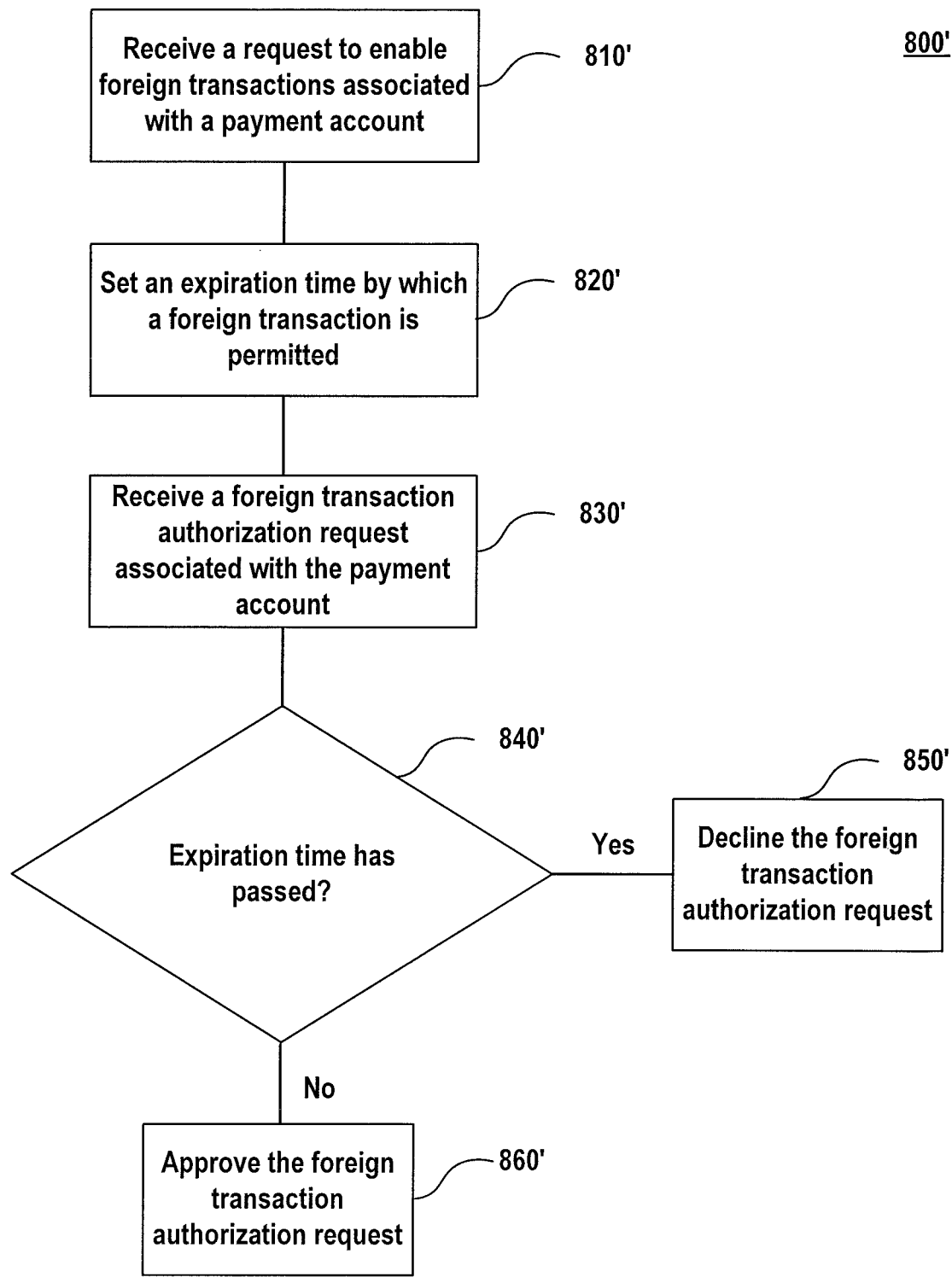

FIG. 8B is a flow chart of another exemplary process 800' utilizing an expiration time as the condition to manage the foreign transaction service. In step 810', FSP system 130 may receive a request to enable foreign transaction service associated with a payment account of a user, such as user 110. Step 810' is similar to step 810. In step 820', FSP system 130 may set an expiration time by which a foreign transaction is permitted. The expiration time may be a time point specified in at least one of weeks, days, and hours. For example, an expiration time may be specified as May 1, 2018 at 6:00 PM Eastern Time. In another example, an expiration time may be specified as Jun. 2, 2018. The expiration time may be used to indicate, for example, the latest time by which a foreign transaction is permitted. The expiration time may be associated with the payment account and may be set or reset based on user request. For example, user 110 may request to enable foreign transaction service at time t in step 810', and FSP system 130 may set the expiration time at t+w, where w is a predetermined time window. In another example, user 110 may specify the time window w to be, for example, 24 hours, five days, one week, etc. FSP system 130 may then set the expiration time accordingly.

In step 830', FSP system 130 may receive a foreign transaction authorization request, similar to step 830. In step 840', FSP system 130 may determine if the expiration time has passed. For example, FSP system 130 may compare the time point at which the foreign transaction authorization request is received and the expiration time. If the foreign transaction authorization request is received after the expiration time, then FSP system 130 may determine that the expiration time has passed. Otherwise, FSP system 130 may determine that the expiration time has not passed. In another example, FSP system 130 may compare a current time (not necessarily the time of receiving the foreign transaction authorization request) with the expiration time. If the current time is later than the expiration time, then FSP system 130 may determine that the expiration time has passed. Otherwise, FSP system 130 may determine that the expiration time has not passed. FSP system 130 may also compare other types of time associated with or relating to the foreign transaction authorization request for determining if the expiration time has passed.

In step 840', after FSP system 130 makes a determination as to whether the expiration time has passed, FSP system 130 may, in step 860', approve the foreign transaction authorization request when the expiration time has not passed, or, in step 850', decline the foreign transaction authorization request when the expiration time has passed.

Figure 9:
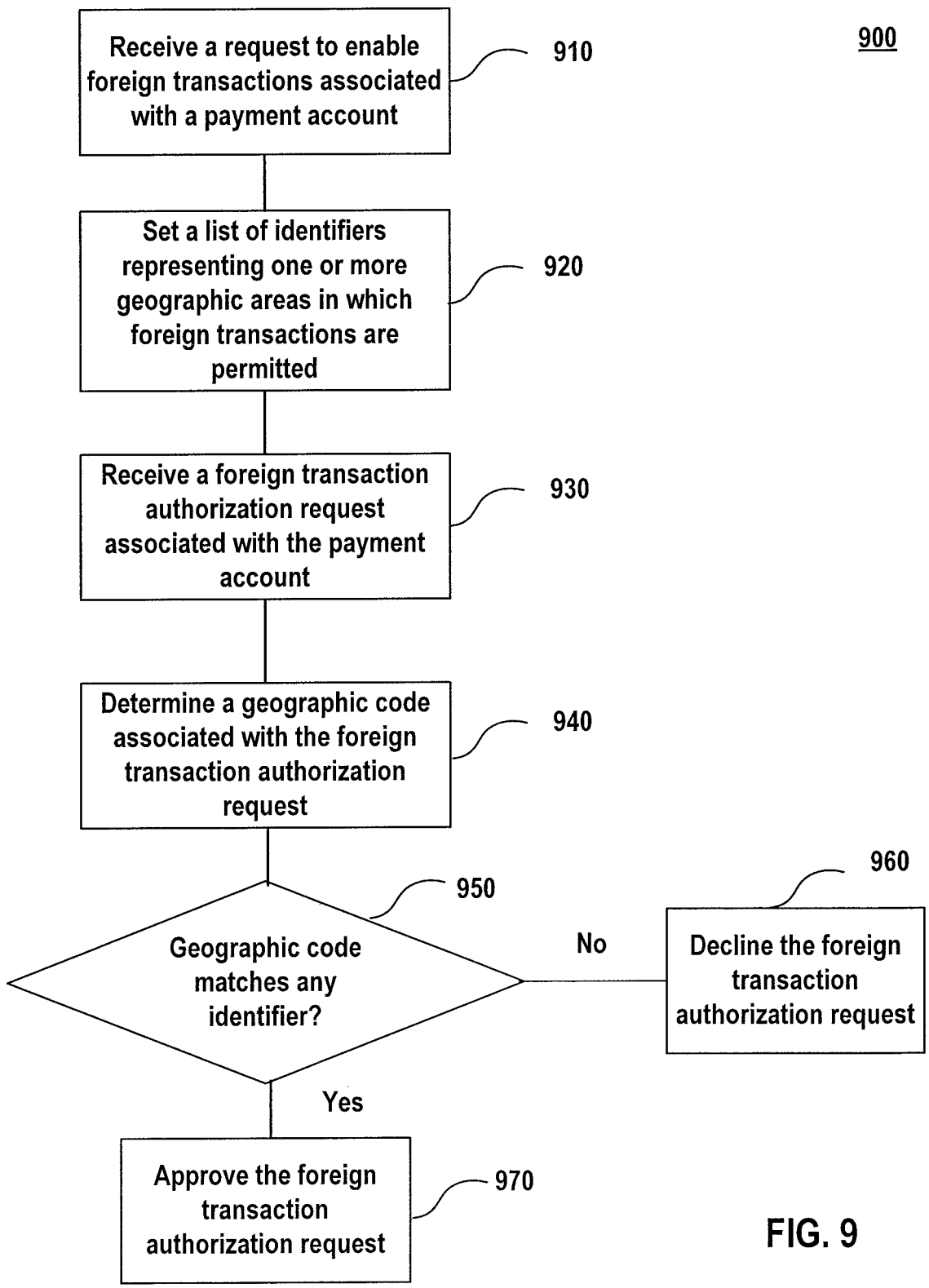

FIG. 9 is a flow chart of an exemplary process 900 for managing foreign transactions based on geographic area information. In step 910, FSP system 130 may receive a request to enable foreign transaction service associated with a payment account of a user, such as user 110. Step 910 is similar to step 710. In step 920, FSP system 130 may set a list of identifiers representing one or more geographic areas in which foreign transactions are permitted. For example, user 110 may specify in which country/region or a group of countries/regions the foreign transaction feature should be enabled through an application user interface, such as interface 360 shown in FIG. 3H. The geographic area information may then be sent to FSP system 130 by user device 112. After receiving the geographic area information, FSP system 130 may identify a list of identifiers, such as country codes, that represent the geographic area(s) (e.g., countries/regions) specified by user 110, and associate the list with the user's payment account. In some embodiments, the identifiers may include country codes used in the global telephone system or any other identifiers representing the countries/regions associated with financial transactions.

In step 930, FSP system 130 may receive a foreign transaction authorization request associated with the payment account. Step 930 is similar to step 730. In step 940, FSP system 130 may determine a geographic code associated with the foreign transaction authorization request. For example, FSP system 130 may check the country code associated with the foreign transaction authorization request. FSP system may determine the geographic area (e.g., country) from which the foreign transaction authorization request is initiated based on the country code. In another example, FSP system 130 may determine merchant information based on the foreign transaction authorization request. The merchant information may include merchant identification information, location information, merchant category information, etc. FSP system may determine the geographic area from which the foreign transaction authorization request is initiated based on merchant information.

In step 950, FSP system 130 may determine whether the geographic code matches any of the identifiers in the list. If the geographic code matches at least one identifier, it indicates that the foreign transaction authorization request is initiated from a country that is set by user 110 as a permitted country to conduct foreign transactions, and FSP system 130 may approve the foreign transaction authorization request. If the geographic code does not match any of the identifier in the list, then FSP system 130 may decline the foreign transaction authorization request.

It is noted that while the list of identifiers set by FSP system 130 is described as a list of permitted geographic areas for conducting foreign transactions in connection with FIG. 9, the opposite may also be implemented to achieve the same effect. In this case, a list of identifiers may be set by FSP system 130 to represent those geographic areas where foreign transactions are not permitted. The processing of a foreign transaction authorization request is likewise reversed. If a geographic code determined from the foreign transaction authorization request does not match any of the identifiers in the list, then FSP system 130 may approve the foreign transaction request. Otherwise, FSP system 130 may decline the foreign transaction request. Depending on how many countries user 110 set to enable the foreign transaction service, the permitted list (when a smaller number of countries is set to enable the foreign transaction service) or the non-permitted list (when a smaller number of countries is set to disable the foreign transaction service) may be used to implement the geographic area management function.

In some embodiments, geographic area control may be used to manage the foreign transaction service in connection with the time window control discussed above in connection with FIGS. 8A and 8B. For example, a foreign transaction request may be approved only if both the time window condition and the geographic area condition are satisfied. In other embodiments, foreign transaction service may be managed based on either one of the geographic area condition or the time window condition.

Figure 10:
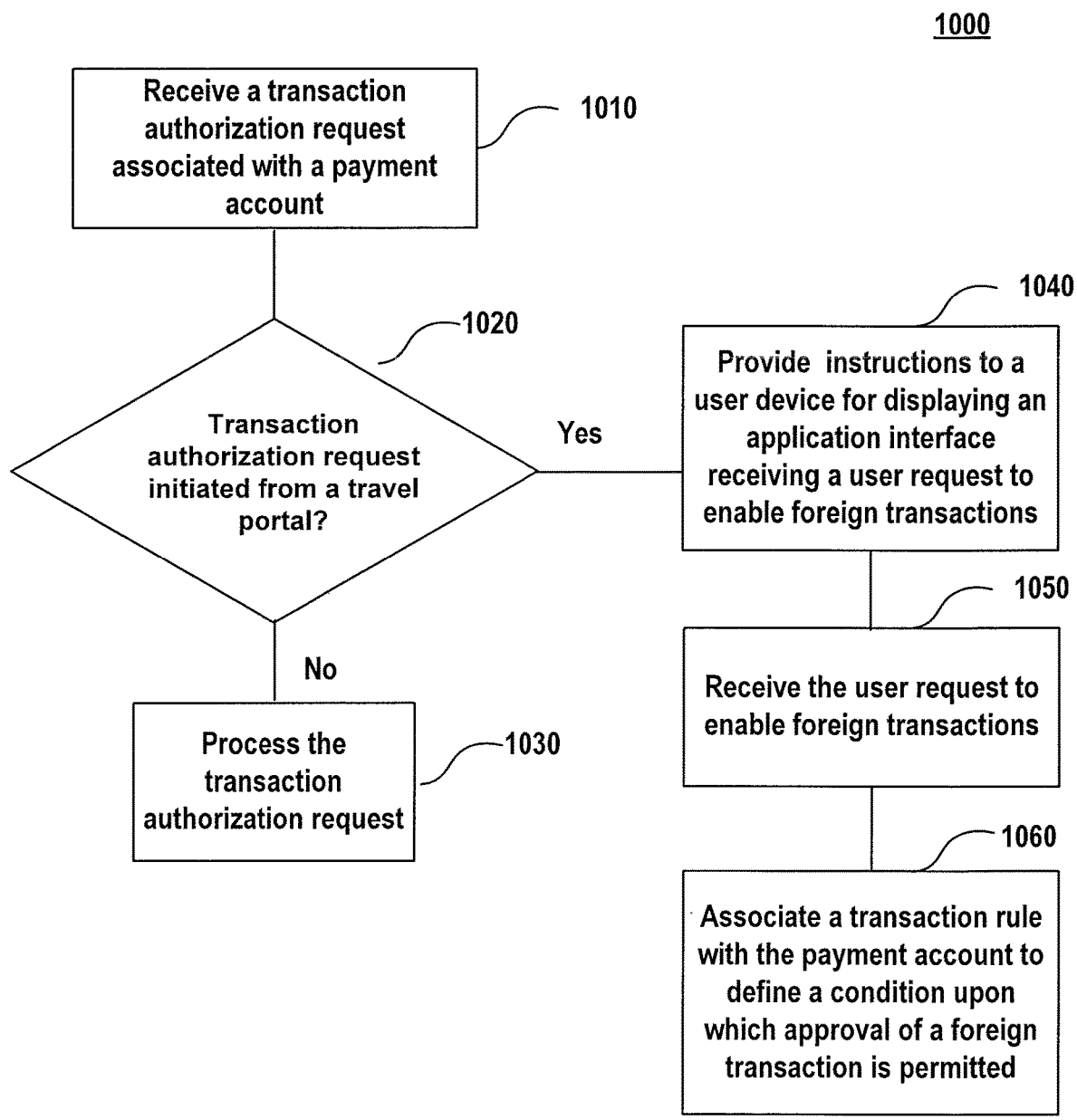
FIGS. 10 and 11 are flowcharts of exemplary processes for temporarily enabling a foreign transaction feature, consistent with the disclosed embodiments.

FIG. 10 is a flow chart of an exemplary method 1000 for temporarily enabling a foreign transaction feature associated with a payment account of a user, such as user 110. In step 1010, FSP system 130 may receive a transaction authorization request associated with a payment account, similar to steps 730 and 830. In step 1020, FSP system 130 may determine whether the transaction authorization request is initiated from a travel portal. As discussed above, a travel portal may include physical travel portals such as an airport, a train station, a sea port, etc., as well as virtual or online travel portals such as a travel website, a travel mobile application, etc. FSP system 130 may determine whether the transaction authorization request is initiated from a travel portal by checking the merchant information associated with the transaction authorization request. As discussed above, merchant information may include merchant identification information, merchant location information, merchant category information, etc. For example, when user 110 purchases a gift at a duty-free store located in an international airport using payment card 114, the purchase transaction request may be received by FSP system 130 for processing. The transaction request may include the merchant's name, store location, and the type of business the merchant does. For example, the location information may reveal that the merchant is located in an international airport. In another example, the merchant category information may reveal that the merchant is a duty-free store. FSP system may extract such information from the purchase transaction request and determine if the purchased is made at a travel portal, which indicates that user 110 is likely on a trip to a foreign country and therefore may need to enable the foreign transaction feature of his/her payment account.

In another example, user 110 may purchase an international air ticket from an airline website or a travel agency website using payment card 114. FSP system 130 may identify, based on the purchase transaction information, that the merchant is a travel portal. FSP system 130 may further obtain additional information such as the travel itinerary (e.g., flight number, departure date/time, return date/time, destination, etc.). Based on such information, FSP system 130 may determine that user 110 is likely planning a trip to visit one or more foreign countries, and may need to make foreign transactions during the trip.

If FSP system 130 determines that the transaction authorization request is not initiated from a travel portal, then process 1000 proceeds to step 1030, in which FSP system 130 may process the transaction authorization request according to any known method. If FSP system 130 determines that the transaction authorization request is initiated from a travel portal, then process 1000 proceeds to step 1040, in which FSP system 130 may provide instructions to user device 112 for display an application interface receiving a user request to enable foreign transaction, such as the user interfaces shown in FIGS. 6B-6E. In step 1050, FSP system 130 may receive the user request to enable the foreign transaction feature, similar to step 710. In step 1060, FSP system 130 may associate a transaction rule with the payment account of the user to define a condition upon which approval of a foreign transaction is permitted, similar to step 720.

Figure 11:
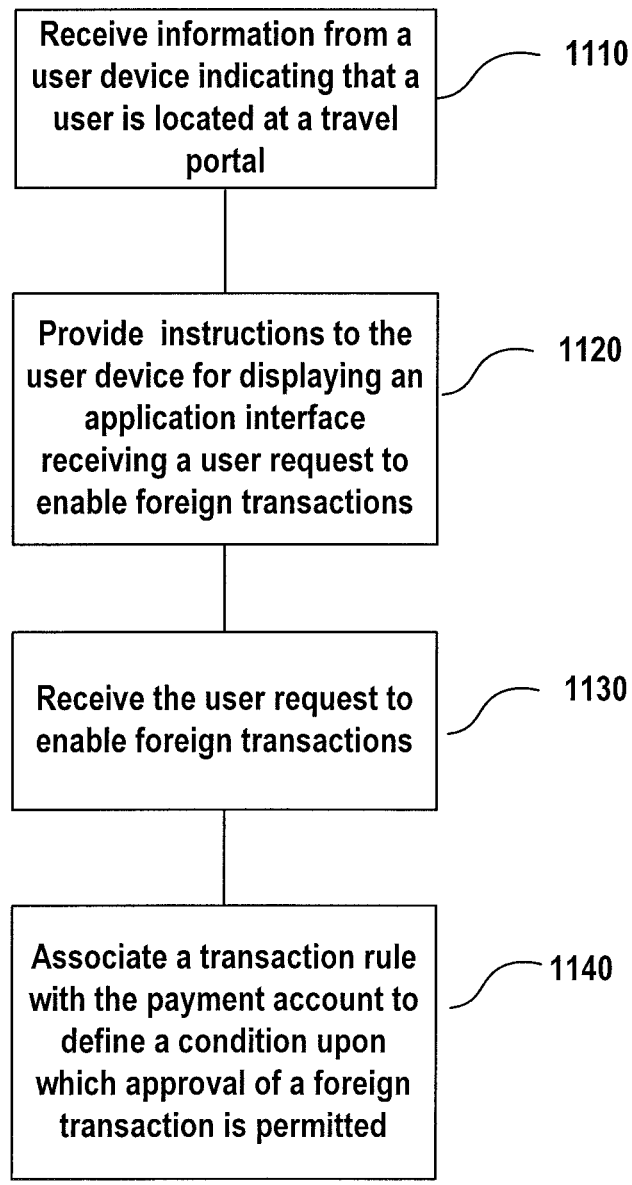

FIG. 11 is a flow chart of an exemplary method 1100 for temporarily enabling foreign transactions based on location information of a user, such as user 110. In step 110, FSP system 130 may receive information from user device 112 indicating that user 110 is located at a travel portal. As discussed above in connection with FIG. 6F, user device 110 may be equipped with a location sensor to provide location information, and user device 112 may send the location information to FSP system 130 for analysis and determination of whether the location information indicates that user 110 is at a travel portal. User device 112 may also be configured to determine whether the location information indicates that user 110 is at a travel portal, and send the determination to FSP system 130. In step 1120, FSP system 130 may provide instructions to user device 112 for displaying an application interface, such as the interfaces shown in FIGS. 6F and 6B-6D, to suggest user 110 to enable foreign transactions and receive user input to request enabling foreign transactions. Step 1120 is similar to step 1040. In step 1130, FSP system 130 may receive the user request to enable foreign transaction, similar to step 1050. In step 1140, FSP system 130 may FSP system 130 may associate a transaction rule with the payment account of the user to define a condition upon which approval of a foreign transaction is permitted, similar to step 1060.

The above described processes may be implemented as a computer program or application or as a plugin module or sub component of another application. Some of the described processes may be executed by a computing system 200 of FSP system 130, merchant system 120, user device 112 or other system provided as part of payment processing network 145. The described techniques may be varied and are not limited to the examples or descriptions provided.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity performing the transaction authorization methods, it is to be understood that consistent with disclosed embodiments another entity provided as part of payment processing network 145, for example, may provide such services in conjunction with or separate from a financial service provider. In some embodiments, a financial service provider may provide the disclosed account information, time-related information and transaction rules as part of a database accessible to payment processing network 145.

The disclosed embodiments provide a card user control and ability to enable/disable foreign transactions on his/her own terms, instead of relying on notification to the card issue and leaving the foreign transaction management task to the card issuer's specific fraud prevention measures, which may be complicated to understand or even different from the user's intent. In addition, the user may control the duration and/or location in which foreign transactions are allowed, and may be notified to turn ON the foreign transaction feature based on a detection that the user is at a travel portal.

The claims are to be interpreted broadly based on the language employed in the claims and not limited to examples described in the present specification, which are non-exclusive. For example, aspects of the disclosed embodiments are described as being associated with data stored in memory, and one skilled in the art will appreciate that these aspects can be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

What is claimed is:

1. A system for facilitating activation of foreign transaction services via a terminal-purchase-triggered alert, the system comprising:
   one or more processors configured to execute instructions to perform operations comprising:
      receiving a transaction request associated with a payment account of a user, the transaction request comprising transaction information indicating occurrence of a purchase transaction;
      in response to the transaction information in the transaction request indicating the occurrence of the purchase transaction, determining that the purchase transaction indicates a purchase of a travel-related product;
      in response to determining that the purchase transaction indicates the purchase of the travel-related product, extracting a plurality of consecutive time periods and a plurality of geographic areas corresponding to the plurality of consecutive time periods;
      generating, based on the plurality of consecutive time periods and the plurality of geographic areas, a purchase-transaction-triggered alert comprising (i) an indication of the purchase transaction and (ii) an interactive graphical component to enable a foreign transaction service for the plurality of consecutive time periods associated with the payment account of the user, wherein the interactive graphical component comprises a plurality of indications for the plurality of consecutive time periods and the plurality of geographic areas, and wherein the interactive graphical component causes, upon activation, initialization of the foreign transaction service during the plurality of consecutive time periods for each corresponding geographic area of the plurality of geographic areas;
      transmitting the purchase-transaction-triggered alert to a user device;
      in response to user activation of the interactive graphical component in the purchase-transaction-triggered alert, activating of the foreign transaction service during the plurality of consecutive time periods for each corresponding geographic area of the plurality of geographic areas and configuring the payment account with a transaction rule, the transaction rule defining a condition upon which approval of a foreign transaction is permitted; and
      subsequent to receiving a foreign transaction request associated with the payment account, approving the foreign transaction request according to the plurality of consecutive time periods and the plurality of geographic areas.

2. The system of claim 1, wherein the condition specifies an identifier representing a foreign geographical area in which the foreign transaction is permitted, and the operations further comprise:
   determining a geographic code associated with the foreign transaction request, the geographic code indicating the foreign geographical area from which the foreign transaction request is initiated;
   approving the foreign transaction request when the geographic code matches the identifier; and
   declining the foreign transaction request when the geographic code does not match the identifier.

3. The system of claim 1, wherein the condition specifies an identifier representing a foreign geographical area in which the foreign transaction is not permitted, and the operations further comprise:
   determining a geographic code associated with the foreign transaction request, the geographic code indicating the foreign geographical area from which the foreign transaction request is initiated;
   declining the foreign transaction request when the geographic code matches the identifier; and
   approving the foreign transaction request when the geographic code does not match the identifier.

4. The system of claim 1, wherein the operations further comprise setting, in response to a request to enable the foreign transaction service, a timer associated with a duration of a time window within which foreign transactions are permitted.

5. The system of claim 4, wherein the operations further comprise:
   providing, to the user device, data indicative of the duration of the time window, the data being synchronized with the timer.

6. The system of claim 1, wherein the operations further comprise:
   providing, to the user device, instructions for displaying information representing a remaining time in which the foreign transaction service is enabled based on a time window within which foreign transactions are permitted.

7. The system of claim 1, wherein the operations further comprise disabling the foreign transaction service after a time window expires.

8. A computer-implemented method comprising:
   receiving a transaction request associated with a payment account of a user, the transaction request comprising transaction information indicating occurrence of a purchase transaction;
   determining that the purchase transaction indicates a purchase of a travel-related product;
   in response to determining that the purchase transaction indicates the purchase of the travel-related product, extracting a plurality of consecutive time periods and a plurality of geographic areas corresponding to the plurality of consecutive time periods;
   generating, based on the plurality of consecutive time periods and the plurality of geographic areas, a purchase-transaction-triggered alert comprising (i) an indication of the purchase transaction and (ii) an interactive graphical component to enable a foreign transaction service for the plurality of consecutive time periods associated with the payment account of the user, wherein the interactive graphical component comprises a plurality of indications for the plurality of consecutive time periods and the plurality of geographic areas, and wherein the interactive graphical component causes, upon activation, initialization of the foreign transaction service during the plurality of consecutive time periods for each corresponding geographic area of the plurality of geographic areas;

transmitting, the purchase-transaction-triggered alert to a user device;

configuring, based on user activation the interactive graphical component, the payment account with a transaction rule, the transaction rule defining a condition upon which approval of a foreign transaction is permitted; and subsequent to receiving a foreign transaction request associated with the payment account, approving the foreign transaction request according to the plurality of consecutive time periods and the plurality of geographic areas.

9. The computer-implemented method of claim 8, wherein the condition specifies an identifier representing a foreign geographical area in which the foreign transaction is permitted, the computer-implemented method further comprising:

determining a geographic code associated with the foreign transaction request, the geographic code indicating the foreign geographical area from which the foreign transaction request is initiated;

approving the foreign transaction request when the geographic code matches the identifier; and declining the foreign transaction request when the geographic code does not match the identifier.

10. The computer-implemented method of claim 8, wherein the condition specifies an identifier representing a foreign geographical area in which the foreign transaction is not permitted, the computer-implemented method further comprising:

determining a geographic code associated with the foreign transaction request, the geographic code indicating the foreign geographical area from which the foreign transaction request is initiated;

declining the foreign transaction request when the geographic code matches the identifier; and approving the foreign transaction request when the geographic code does not match the identifier.

11. The computer-implemented method of claim 8, further comprising, setting, in response to a request to enable the foreign transaction service, a timer associated with a duration of a time window within which foreign transactions are permitted.

12. The computer-implemented method of claim 11, further comprising providing, to the user device, data indicative of the duration of the time window, the data being synchronized with the timer.

13. The computer-implemented method of claim 8, further comprising providing, to the user device, instructions for displaying information representing a remaining time in which the foreign transaction service is enabled based on a time window within which foreign transactions are permitted.

14. The computer-implemented method of claim 8, further comprising disabling the foreign transaction service after a time window expires.

15. A non-transitory, computer-readable medium storing instructions for facilitating activation of foreign transaction services via a terminal-purchase-triggered alert, when executed by one or more processors, cause the one or more processors to perform operations comprising:

receiving a transaction request associated with a payment account of a user, the transaction request comprising transaction information indicating occurrence of a purchase transaction;

determining that the purchase transaction indicates a purchase of a travel-related product;

in response to determining that the purchase transaction indicates the purchase of the travel-related product, extracting a plurality of consecutive time periods and a plurality of geographic areas corresponding to the plurality of consecutive time periods;

generating, based on the plurality of consecutive time periods and the plurality of geographic areas, a purchase-transaction-triggered alert comprising (i) an indication of the purchase transaction and (ii) an interactive graphical component to enable a foreign transaction service for the plurality of consecutive time periods associated with the payment account of the user, wherein the interactive graphical component comprises a plurality of indications for the plurality of consecutive time periods and the plurality of geographic areas, and wherein the interactive graphical component causes, upon activation, initialization of the foreign transaction service during the plurality of consecutive time periods for each corresponding geographic area of the plurality of geographic areas;

transmitting, the purchase-transaction-triggered alert to a user device;

configuring, based on user activation the interactive graphical component, the payment account with a transaction rule, the transaction rule defining a condition upon which approval of a foreign transaction is permitted; and subsequent to receiving a foreign transaction request associated with the payment account, approving the foreign transaction request based on configuration of the payment account and the foreign transaction request meeting the condition of the transaction rule.

16. The non-transitory, computer-readable medium of claim 15, wherein the condition specifies an identifier representing a foreign geographical area in which the foreign transaction is permitted, the instructions further causing the one or more processors to perform operations comprising:

determining a geographic code associated with the foreign transaction request, the geographic code indicating the foreign geographical area from which the foreign transaction request is initiated;

approving the foreign transaction request when the geographic code matches the identifier; and declining the foreign transaction request when the geographic code does not match the identifier.

17. The non-transitory, computer-readable medium of claim 15, wherein the condition specifies an identifier representing a foreign geographical area in which the foreign transaction is not permitted, the instructions further causing the one or more processors to perform operations comprising:

determining a geographic code associated with the foreign transaction request, the geographic code indicating the foreign geographical area from which the foreign transaction request is initiated;

declining the foreign transaction request when the geographic code matches the identifier; and approving the foreign transaction request when the geographic code does not match the identifier.

18. The non-transitory, computer-readable medium of claim 15, wherein instructions further cause the one or more processors to set, in response to a request to enable the foreign transaction service, a timer associated with a duration of a time window within which foreign transactions are permitted.

19. The non-transitory, computer-readable medium of claim 18, wherein the instructions further cause the one or more processors to provide, to the user device, data indicative of the duration of the time window, the data being synchronized with the timer.

20. The non-transitory, computer-readable medium of claim 15, wherein the instructions further cause the one or more processors to provide, to the user device, instructions for displaying information representing a remaining time in which the foreign transaction service is enabled based on a time window within which foreign transactions are permitted.

\* \* \* \* \*